(12) United States Patent  (10) Patent No.: US 8,838,839 B2
Mizumaki  (45) Date of Patent: Sep. 16, 2014

(54) STORAGE APPARATUS AND COMMAND EXECUTION CONTROL METHOD

(71) Applicant: Fujitsu Limited, Kawasaki (JP)

(72) Inventor: Masayoshi Mizumaki, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/672,787

(22) Filed: Nov. 9, 2012

(65) Prior Publication Data

US 2013/0159556 A1  Jun. 20, 2013

(30) Foreign Application Priority Data

Dec. 19, 2011  (JP) .................. 2011-277303

(51) Int. Cl.
G06F 3/00 (2006.01)
G06F 13/00 (2006.01)

(52) U.S. Cl.
USPC .............................. 710/5; 710/110

(58) Field of Classification Search
CPC .............................. G06F 3/0659; G06F 3/067
See application file for complete search history.

(56) References Cited

U.S. PATENT DOCUMENTS

| 6,947,981 B2 | 9/2005 | Lubbers et al. | |
| 2003/0046568 A1* | 3/2003 | Riddick et al. | 713/193 |
| 2003/0229741 A1* | 12/2003 | Stuber et al. | 710/110 |
| 2006/0190777 A1* | 8/2006 | Chuang et al. | 714/701 |
| 2007/0078961 A1 | 4/2007 | Kumano et al. | |
| 2007/0255998 A1* | 11/2007 | Chuang et al. | 714/763 |

FOREIGN PATENT DOCUMENTS

| EP | 1548562 A2 | 6/2005 |
| JP | 10-307747 A | 11/1998 |
| JP | 2005-190057 | 7/2005 |
| JP | 2007-079885 | 3/2007 |

OTHER PUBLICATIONS

Korean Office Action mailed Jun. 27, 2014 for corresponding Korean Application No. 10-2012-141246, with Partial English Translation, 9 pages.

* cited by examiner

Primary Examiner — Hyun Nam
(74) Attorney, Agent, or Firm — Fujitsu Patent Center

(57) ABSTRACT

A determination unit determines the type of a command received via a communication interface. A counting unit counts, among commands received via the communication interface, the number of commands currently being executed. A control unit performs, when the number of commands currently being executed is less than or equal to a limit value corresponding to the type of a command received via the communication interface, data access to a memory device according to the received command. In addition, the control unit prevents the data access according to the received command when the number of commands currently being executed exceeds the limit value corresponding to the type of the received command.

10 Claims, 29 Drawing Sheets

FIG. 7

| 50 COMMAND MANAGEMENT TABLE ||
|---|---|
| COMMAND LIMIT VALUE | 768 |
| COMMAND EXECUTION COUNT | 642 |

FIG. 10

60 SESSION MANAGEMENT TABLE

| RA-SOURCE VOLUME NUMBER | RA-DESTINATION VOLUME NUMBER | SESSION TYPE |
|---|---|---|
| 001 | 001 | REMOTE COPY SESSION (APPARATUS ID: XXXXXXXX) |
| 002 | 002 | REMOTE COPY SESSION (APPARATUS ID: XXXXXXXX) |
| 003 | 003 | REMOTE COPY SESSION (APPARATUS ID: XXXXXXXX) |
| 004 | 004 | REMOTE COPY SESSION (APPARATUS ID: XXXXXXXX) |
| 005 | 010 | LOCAL COPY SESSION |
| 006 | 011 | LOCAL COPY SESSION |
| 007 | 012 | LOCAL COPY SESSION |
| 008 | 013 | LOCAL COPY SESSION |

FIG. 13

51 COMMAND MANAGEMENT TABLE

| | |
|---|---|
| HOST COMMAND EXECUTION COUNT | 576 |
| CUMULATIVE NUMBER OF RA-DESTINATION HOST COMMANDS (tc) | 2000 |
| RA-DESTINATION HOST COMMAND LIMIT VALUE (tcs) | 677 |
| COPY COMMAND EXECUTION COUNT | 312 |
| CUMULATIVE NUMBER OF RA-DESTINATION COPY COMMANDS (tr) | 1024 |
| RA-DESTINATION COPY COMMAND LIMIT VALUE (trs) | 347 |

FIG. 17

52 RA-SOURCE COMMAND MANAGEMENT TABLE

| HOST COMMAND EXECUTION COUNT | 624 |
|---|---|
| CUMULATIVE NUMBER OF RA-SOURCE HOST COMMANDS (ic) | 3000 |
| RA-SOURCE HOST COMMAND LIMIT VALUE (ics) | 878 |
| RA COMMAND COUNT | 1500 |
| RA COMMAND RATE (p) | 0.5 |

FIG. 18

| 53 RA-DESTINATION COMMAND MANAGEMENT TABLE | |
|---|---|
| HOST COMMAND EXECUTION COUNT | 576 |
| CUMULATIVE NUMBER OF RA-DESTINATION HOST COMMANDS (tc) | 2000 |
| RA-DESTINATION HOST COMMAND LIMIT VALUE (tcs) | 585 |
| COPY COMMAND EXECUTION COUNT | 312 |
| CUMULATIVE NUMBER OF RA-DESTINATION COPY COMMANDS (tr) | 1024 |
| RA-DESTINATION COPY COMMAND LIMIT VALUE (trs) | 439 |
| CUMULATIVE NUMBER OF RA-SOURCE HOST COMMANDS (ic) | 3000 |
| RA COMMAND RATE (p) | 0.5 |

FIG. 24

55 RA-SOURCE COMMAND MANAGEMENT TABLE

| | |
|---|---|
| HOST COMMAND EXECUTION COUNT | 624 |
| CUMULATIVE NUMBER OF RA-SOURCE HOST COMMANDS (ic) | 3000 |
| RA-SOURCE HOST COMMAND LIMIT VALUE (ics) | 324 |
| RA COMMAND COUNT | 1500 |
| RA COMMAND RATE (p) | 0.5 |
| CA COMMAND PROCESSING TIME (cT) | 1ms |
| RA COMMAND PROCESSING TIME (rT) | 4ms |

FIG. 25

56 RA-DESTINATION COMMAND MANAGEMENT TABLE

| | |
|---|---|
| HOST COMMAND EXECUTION COUNT | 576 |
| CUMULATIVE NUMBER OF RA-DESTINATION HOST COMMANDS (tc) | 2000 |
| RA-DESTINATION HOST COMMAND LIMIT VALUE (tcs) | 862 |
| COPY COMMAND EXECUTION COUNT | 312 |
| CUMULATIVE NUMBER OF RA-DESTINATION COPY COMMANDS (tr) | 1024 |
| RA-DESTINATION COPY COMMAND LIMIT VALUE (trs) | 162 |
| CUMULATIVE NUMBER OF RA-SOURCE HOST COMMANDS (ic) | 3000 |
| RA COMMAND RATE (p) | 0.5 |
| CA COMMAND PROCESSING TIME (cT) | 1ms |
| RA COMMAND PROCESSING TIME (rT) | 4ms |

STORAGE APPARATUS AND COMMAND EXECUTION CONTROL METHOD

CROSS-REFERENCE TO RELATED APPLICATION

This application is based upon and claims the benefit of priority of the prior Japanese Patent Application No. 2011-277303, filed on Dec. 19, 2011, the entire contents of which are incorporated herein by reference.

FIELD

The embodiments discussed herein are related to a storage apparatus and a command execution control method.

BACKGROUND

A storage apparatus, such as a Redundant Arrays of Inexpensive Disks (RAID) apparatus, includes for example a channel adapter (CA) as a communication interface connected to a host computer. The CA is connected to a host bus adapter (HBA) of the host computer via, for example, a channel switch. The host computer communicates with the CA by the HBA to gain access to data stored in the storage apparatus. The CA of the storage apparatus may be used for not only communication with the host computer but also communication with another storage apparatus. For example, a flexible data replication mechanism for replicating data between storage cells has been proposed.

U.S. Patent Application Publication No. 2003/0187945

However, in the case where a single CA is used for both types of access operations, i.e., access operations made by the host computer to the storage apparatus and access operations performed with another storage apparatus, if access operations of one type increase in number, access operations of the other type are slowed. For example, it is sometimes the case that data written to a storage apparatus by a host computer is copied to a different storage apparatus in order to improve the reliability of the data. In this case, if many access operations are made by the host computer to the copy destination storage apparatus, copy processes between the storage apparatuses are suspended. Subsequently, completion of a write command issued from the host computer to the copy source storage apparatus is also delayed, which reduces the overall performance of the system. Thus, in the case of using a single communication interface of a storage apparatus for multiple purposes, an increase in data access in one use application may reduce data access efficiency in another use application. If a reduction in the data access efficiency due to such a dependency relationship takes place randomly, the overall processing efficiency of the system decreases.

SUMMARY

According to an aspect of the embodiments, there is provided a storage apparatus including a memory device; a communication interface configured to receive a command instructing data access to the memory device; and a processor configured to perform a procedure including: determining a type of the command received via the communication interface, counting, among commands received via the communication interface, a number of commands currently being executed, performing, when the number of commands currently being executed is less than or equal to a limit value corresponding to the type of a command newly received via the communication interface, data access to the memory device according to the newly received command, and preventing the data access when the number of commands currently being executed exceeds the limit value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a command management table;

FIG. 10 illustrates an example of a session management table according to the third embodiment;

FIG. 13 illustrates an example of a command management table according to the fourth embodiment;

FIG. 17 illustrates an example of an RA-source command management table;

FIG. 18 illustrates an example of an RA-destination command management table;

FIG. 24 illustrates an example of an RA-source command management table according to the sixth embodiment;

FIG. 25 illustrates an example of an RA-destination command management table according to the sixth embodiment;

DESCRIPTION OF EMBODIMENTS

Figure 1:
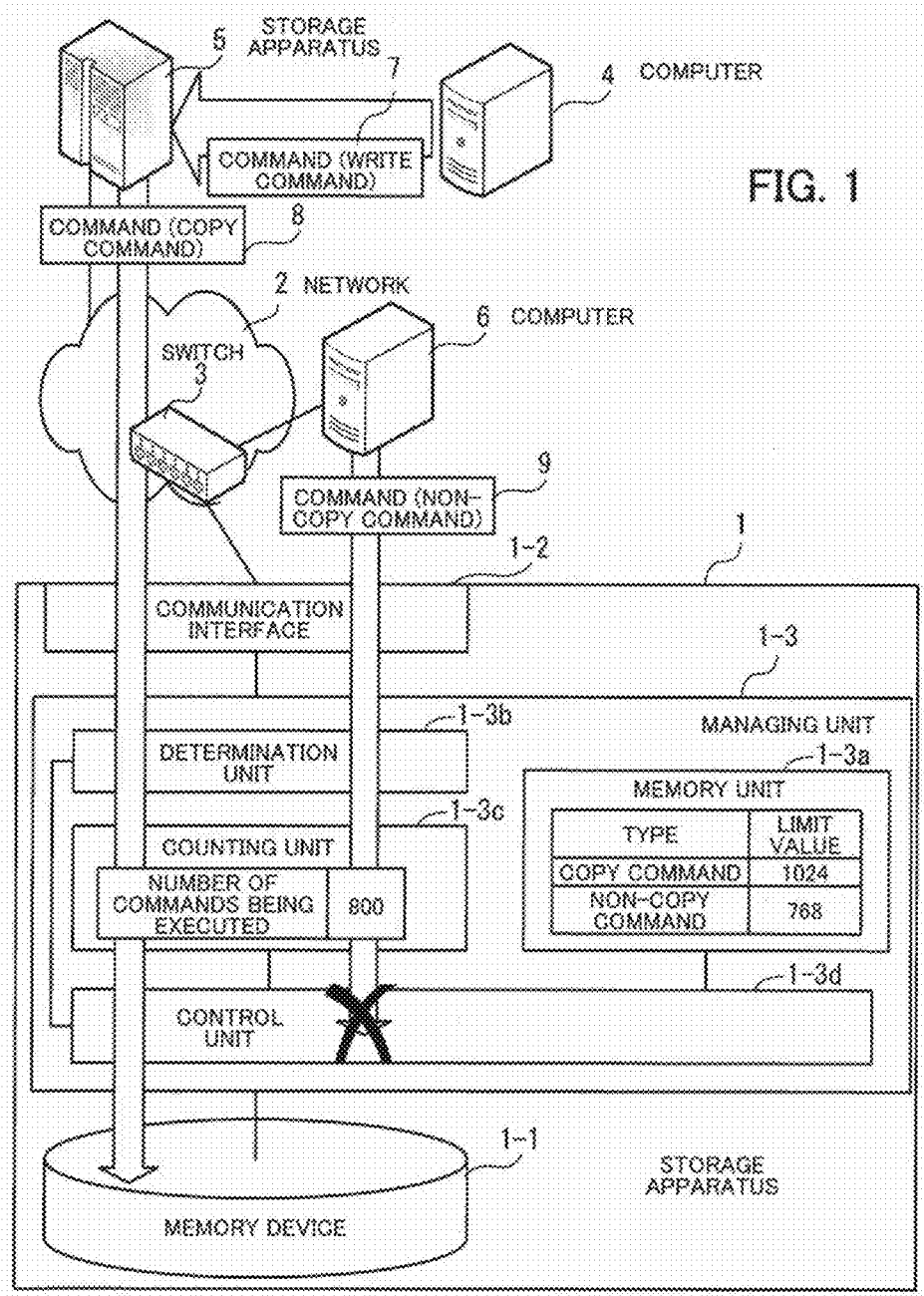
FIG. 1 illustrates an example of a functional configuration of an apparatus according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

A first embodiment is related to command flow control for commands input to a communication interface using limit values varying among types each indicating a command use. Each of the limit values is a threshold indicating the number of commands currently being executed at which point the execution of a corresponding type of commands is prevented. For example, a higher limit value is set for a type of commands corresponding to a use having a greater influence on reducing the overall processing efficiency of the system. With this, even when the number of commands corresponding to a use having a less influence on reducing the overall processing efficiency of the system increases, the execution of the commands is preferentially prevented. Accordingly, this prevents a reduction in the processing efficiency of commands corresponding to a use having a great influence on reducing the overall processing efficiency of the system.

FIG. 1 illustrates an example of a functional configuration of an apparatus according to the first embodiment. A storage apparatus 1 is connected to a storage apparatus 5 and a computer 6 via a switch 3 on a network 2. According to the example of FIG. 1, the storage apparatus 5 is installed distant from the storage apparatus 1. The computer 6 is connected to the storage apparatus 1 via only the switch 3. To the storage apparatus 5, a computer 4 is connected. For example, when data writing is performed with respect to a predetermined storage area of the storage apparatus 5 according to a command 7 (type: write command) for data writing, issued from the computer 4, the storage apparatus 5 performs a process of redundantly storing the written data. For example, the storage apparatus 5 outputs a command 8 (type: copy command) for copying the written data to a memory device 1-1 of the storage apparatus 1. In this case, the command 7 is a trigger of the output of the copy command from the storage apparatus 5. For example, in order to gain access to the memory device 1-1 of the storage apparatus 1, the computer 6 outputs a different type of command 9 (type: non-copy command) from the command 8 output from the storage apparatus 5.

The storage apparatus 1 includes the memory device 1-1, a communication interface 1-2, and a managing unit 1-3. The communication interface 1-2 receives commands indicating data access to the memory device 1-1. Note that the commands input to the communication interface 1-2 are of multiple types. The managing unit 1-3 includes a memory unit 1-3a, a determination unit 1-3b, a counting unit 1-3c, and a control unit 1-3d. The storage unit 1-3a stores, for example, limit values for individual command types. Each of the limit values is a threshold for the number of commands currently being executed, used to determine whether to execute a command of a corresponding type. As the memory unit 1-3a, for example, a memory provided in the managing unit 1-3 is used. The determination unit 1-3b determines the type of a command received via the communication interface 1-2. For example, the determination unit 1-3b determines whether the received command is a copy command issued from the storage apparatus 5 and instructing data copy or a non-copy command which is a command other than a copy command. The counting unit 1-3c counts, among commands received via the communication interface 1-2, the number of commands currently being executed. For example, the counting unit 1-3c increments a counter indicating the number of commands currently being executed each time receiving a command via the communication interface 1-2, and decrements the counter each time transmitting a response to a received command. The control unit 1-3d refers to the memory unit 1-3a to determine whether the number of commands currently being executed is less than or equal to a limit value corresponding to the type of a command received via the communication interface 1-2. Subsequently, if the number of commands currently being executed is less than or equal to the limit value, the control unit 1-3d performs data access to the memory device 1-1 according to the received command. On the other hand, if the number of commands currently being executed exceeds the limit value corresponding to the type of the received command, the control unit 1-3d prevents data access according to the command. For example, in the case of performing data access according to the command, the control unit 1-3d returns a response for the command after the completion of the access. On the other hand, in the case of preventing data access according to the command, the control unit 1-3d returns a response indicating inaccessibility after determining to prevent the data access.

In such a system, assume here that "1024" is set as a limit value corresponding to copy commands and "768" is set as a limit value corresponding to non-copy commands in the memory unit 1-3a. Assume further that the computer outputs the data writing command 7 and data writing corresponding to the command 7 is then performed in the storage apparatus 5. In this case, the command 8 instructing copying of the written data is transmitted from the storage apparatus 5 to the storage apparatus 1. The command 8 is received by the communication interface 1-2 of the storage apparatus 1. Subsequently, the determination unit 1-3b of the managing unit 1-3 determines that the type of the received command 8 is a copy command. In addition, due to the command reception, the counting unit 1-3c increments the number of commands currently being executed. Assume here that the number of commands currently being executed has reached "800". The control unit 1-3d compares the limit value corresponding to the type "copy command" of the received command 8, "1024", and the number of commands currently being executed, "800". In this example, the number of commands currently being executed is less than or equal to the limit value. Accordingly, the control unit 1-3d writes data to the memory device 1-1 according to the received command 8. When the writing is completed, the control unit 1-3d transmits a completion response to the storage apparatus 5. Subsequently, the counting unit 1-3c decrements the number of commands currently being executed.

Assume further that the command 9 instructing data writing to the memory device 1-1 is transmitted from the computer 6 to the storage apparatus 1. The type of the command 9 is a non-copy command, which is a command other than a copy command. The command 9 is received by the communication interface 1-2 of the storage apparatus 1. Subsequently, the determination unit 1-3b of the managing unit 1-3 determines that the type of the received command 9 is a non-copy command. In addition, due to the command reception, the counting unit 1-3c increments the number of commands currently being executed. Assume here that the number of commands currently being executed has reached "800". The control unit 1-3d compares the limit value corresponding to the type "non-copy command" of the received command 9, "768", and the number of commands currently being executed, "800". In this example, the number of commands currently being executed exceeds the limit value. Accordingly, the control unit 1-3d prevents the execution of the command 9. For example, the control unit 1-3d does not perform data access according to the command 9 and transmits a response indicating that the command cannot be executed (hereinafter referred to as the "command inexecutability") to the computer 6. Subsequently, the counting unit 1-3c decrements the number of commands currently being executed.

As described above, in the storage apparatus 1, a different limit value according to the type of a command is applied to determine whether to execute a received command. This prevents a reduction in the overall processing efficiency of the system in the case where the communication interface 1-2 is used for multiple applications.

For example, in FIG. 1, the storage apparatus 5 is installed distant from the storage apparatus 1, however, the computer 6 is installed close to the storage apparatus 1. In this case, the communication between the storage apparatuses 1 and 5 requires more time compared to the communication between the storage apparatus 1 and the computer 6. Here, let us consider the case in which the technology of the first embodiment is not applied and the same limit value is used for all the types of commands. In this case, when the number of commands currently being executed exceeds the limit value, the storage apparatus 1 is able to execute neither a command issued from the storage apparatus 5 nor a command issued from the computer 6. Since being located close to the storage apparatus 1, the computer 6 quickly receives a response indicating command inexecutability and, therefore, is able to retransmit the command. On the other hand, the storage apparatus 5 takes longer time to receive the response indicating command inexecutability than the computer 6 and, therefore, gets behind in command retransmission. Furthermore, the command retransmitted from the storage apparatus 5 takes longer time to reach the storage apparatus 1 compared to the command transmitted from the computer 6. As a result, in the storage apparatus 1, the command transmitted from the computer 6 is executed first, and the execution of the copy command issued from the storage apparatus 5 is suspended. If the copy command issued from the storage apparatus 5 is not completed, a write command which is the trigger of the output of the copy command is also not completed. Accordingly, the computer 4 is also subject to a processing delay. Let us consider, on the other hand, the case in which the technology of the first embodiment is applied and, for example, the limit value for copy commands is set higher than the limit value for non-copy commands. In this case, if the number of commands currently being executed in the storage apparatus 1 progressively increases, execution of a non-copy command output from the computer 6 is prevented before a copy command becomes inexecutable. For example, in the example of FIG. 1, only copy commands issued from the storage apparatus 5 are executed after the number of commands currently being executed exceeds 768. This allows efficient processing of copy commands issued from the storage apparatus 5, which is at a disadvantage because of the delay time for command transmission. As a result, it is possible to prevent the increase in the number of commands issued from the computer 6 to the storage apparatus 1 from having an adverse effect on the computer 4.

Note that the determination unit 1-3b, the counting unit 1-3c, and the control unit 1-3d may be implemented by a central processing unit (CPU) of the storage apparatus 1. For example, a CPU provided inside the managing unit 1-3 executes a program stored in a memory, such as a random access memory (RAM), of the managing unit 1-3, to thereby implement the determination unit 1-3b, the counting unit 1-3c, and the control unit 1-3d. In addition, the memory unit 1-3a may be implemented by a RAM, a hard disk drive (HDD), or the like, included in the storage apparatus 1. Note that, in FIG. 1, each line connecting the individual components represents a part of communication paths, and communication paths other than those illustrated in FIG. 1 are also configurable.

(b) Second Embodiment

Next described is a second embodiment. The second embodiment is related to achieving efficient data copy between storage apparatuses by setting a limit value for the number of host commands issued from a host computer and requesting access to data in a storage apparatus.

Figure 2:
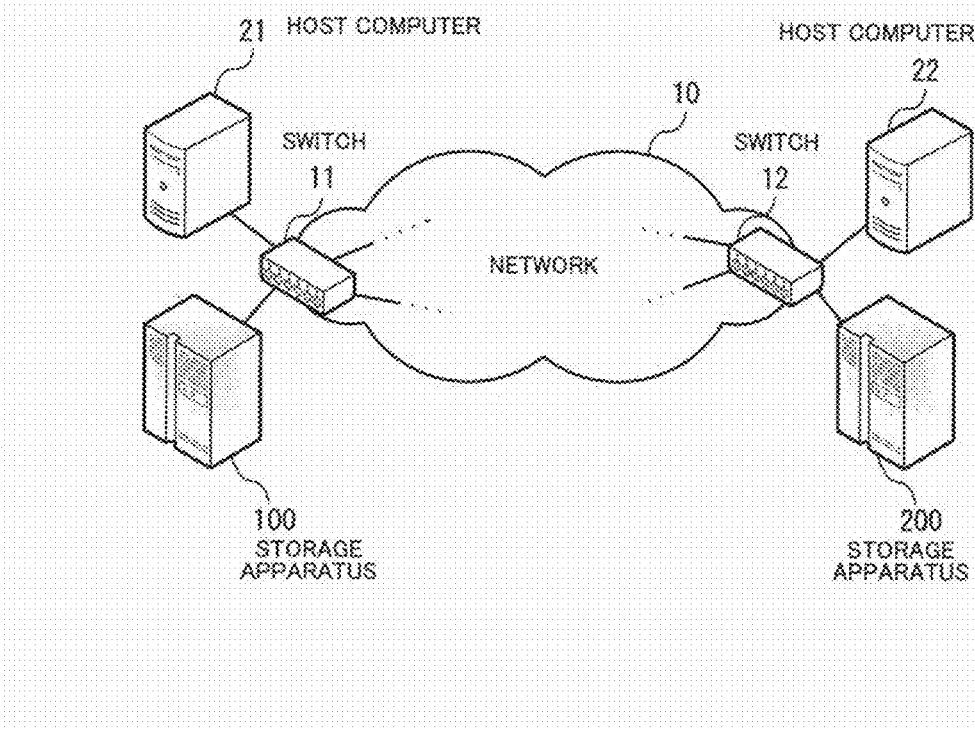
FIG. 2 illustrates an example of a system configuration according to a second embodiment.

FIG. 2 illustrates an example of a system configuration according to the second embodiment. Switches 11 and 12 are connected to each other via a network 10. The switches 11 and 12 are, for example, fiber channel switches. To the switch 11, a host computer 21 and a storage apparatus 100 are connected. To the switch 12, a host computer 22 and a storage apparatus 200 are connected.

For example, the host computer 21 and the storage apparatus 100 are installed in the same facility. Accordingly, access from the host computer 21 to the storage apparatus 100 for data writing or data reading is achieved with less delay time. In addition, the host computer 22 and the storage apparatus 200 are installed in the same facility. Accordingly, access from the host computer 22 to the storage apparatus 200 for data writing or data reading is achieved with less delay time. The facility in which the host computer 21 and the storage apparatus 100 are installed and the facility in which the host computer 22 and the storage apparatus 200 are installed are geographically separated. Therefore, for example, data copy from the storage apparatus 100 to the storage apparatus 200 requires more time compared to access from the host computer 22 to the storage apparatus 200. In such a condition, if a large amount of access takes place from the host computer 22 to the storage apparatus 200, the data copy from the storage apparatus 100 to the storage apparatus 200 may be stopped. In view of this, the second embodiment adopts, as a criterion for determining whether to execute a host command, a stricter criterion than one used for determining whether to execute a copy command. This prevents a reduction in the processing efficiency of the data copy from the storage apparatus 100 to the storage apparatus 200. Note that access from the storage apparatus 100 to the storage apparatus 200 for data copy is referred to as remote access (RA). In addition, a command issued from a host computer to a storage apparatus and instructing data access is referred to as a host command. A command used for data copy between the storage apparatuses 100 and 200 is referred to as a copy command.

Figure 3:
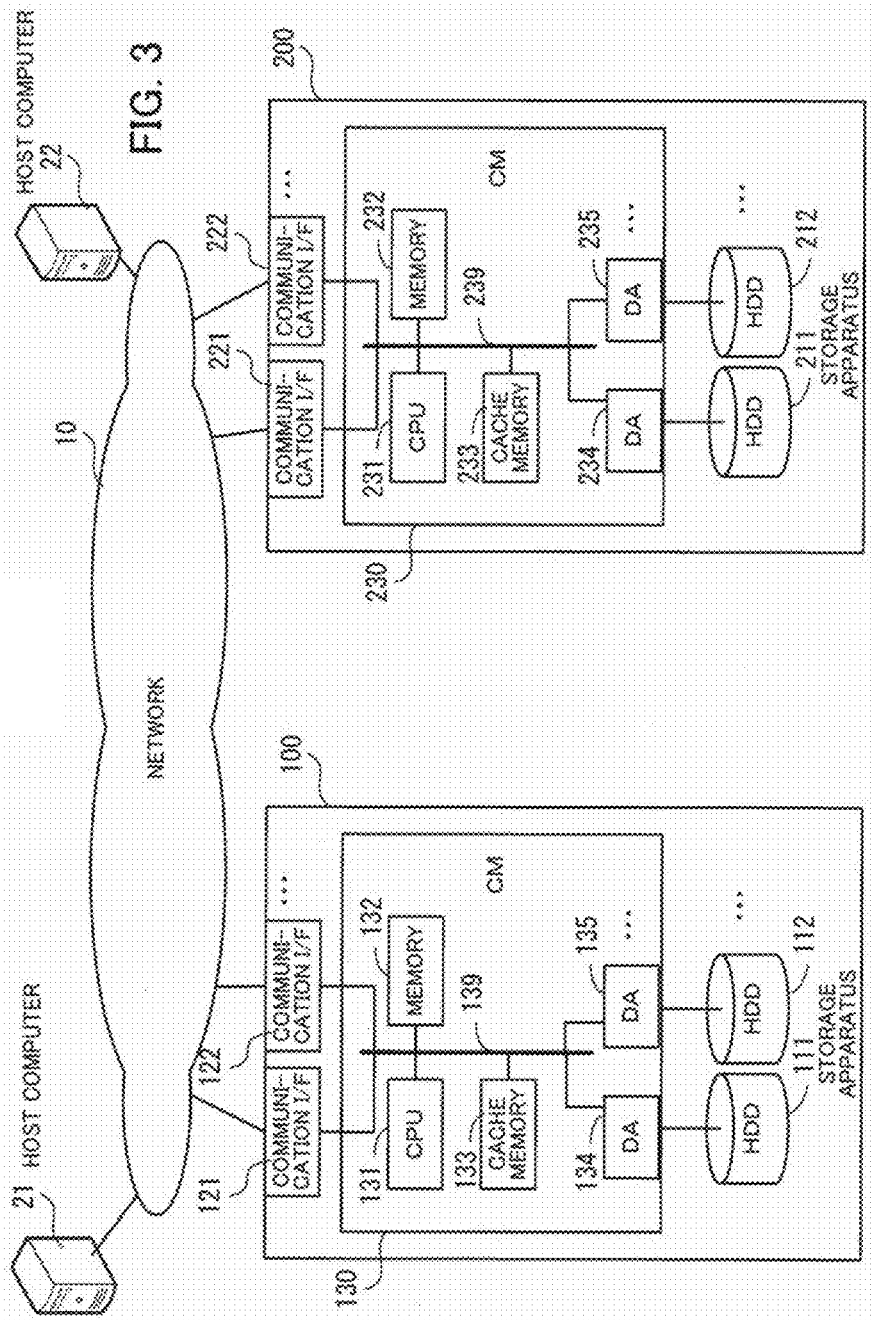
FIG. 3 illustrates an example of hardware configurations of storage apparatuses used in the second embodiment.

FIG. 3 illustrates an example of hardware configurations of storage apparatuses used in the second embodiment. The storage apparatus 100 includes multiple HDDs 111, 112, and . . . , multiple communication interfaces (I/Fs) 121, 122, and . . . , and a controller module (CM) 130. The HDDs 111, 112, and . . . are an example of the memory device. Note that, for the storage apparatus 100, solid-state drives (SSDs) may be used in place of the HDDs 111, 112, and . . . . The multiple communication I/Fs 121, 122, and . . . are CAs used to communicate with the host computer 21. Note that the communication I/Fs 121, 122, and . . . may also be used to communicate with the storage apparatus 200. In addition, the communication I/Fs 121, 122, and . . . may also be used for both communication with the host computer 21 and communication with the storage apparatus 200. Hereinafter, a communication I/F used only for communication with a host computer (host connection) is referred to as the "CA port". On the other hand, a communication I/F used for both communication with a host computer and data copy performed with another storage apparatus is referred to as the "CARA port". The CM 130 is a built-in computer of the storage apparatus 100 and manages resources, such as HDDs, of the storage apparatus 100. For example, to the CM 130, the HDDs 111, 112, and . . . are connected. The CM 130 manages resources (memory function) provided by the connected HDDs 111, 112, and . . . . The CM 130 is able to generate a RAID group by combining multiple HDDs under its control and logically use the generated RAID group as a single volume.

The CM 130 includes a CPU 131, a memory 132, a cache memory 133, and multiple device adapters (DAs) 134, 135, and . . . . Individual components of the CM 130 are connected to each other by an internal bus 139. The CPU 131 exercises overall control over the CM 130. For example, the CPU 131 controls the number of commands input from the individual communication I/Fs 121, 122, and . . . . Note that the CM 130 may include multiple CPUs. In that case, the multiple CPUs exercise overall control over the CM 130 in cooperation with each other. The memory 132 stores various types of information used for control exerted by the CM 130. The memory 132 also stores programs in which processes to be executed by the CPU 131 are described. A nonvolatile memory, such as a flash memory, may be used as the memory 132. The cache memory 133 is a memory for temporarily storing data input and output to and from the HDDs 111, 112, and . . . . The DAs 134, 135, and . . . are respectively connected to the HDDs 111, 112, and . . . , and input and output data to and from the HDD connected thereto.

The storage apparatus 200 includes multiple HDDs 211, 212, and . . . , multiple communication I/Fs 221, 222, and . . . , and a CM 230. The CM 230 includes a CPU 231, a memory 232, a cache memory 233, and multiple DAs 234, 235, and . . . . Individual components of the CM 230 are connected to each other by an internal bus 239. Each of the individual components of the storage apparatus 200 has the same function as a component with the same name of the storage apparatus 100. Note that the CM 230 of the storage apparatus 200 is an example of the managing unit 1-3 of FIG. 1. That is, the functions of the memory unit 1-3a, the determination unit 1-3b, the counting unit 1-3c, and the control unit 1-3d of the first embodiment are implemented by the CM 230.

Using the above-described hardware configurations, it is possible to implement the processing functions of the second embodiment. Note that the storage apparatus 1 of the first embodiment may also be implemented using the same hardware as that of the storage apparatuses 100 and 200 illustrated in FIG. 3. Note that, in FIG. 3, each line connecting the individual components represents a part of communication paths, and communication paths other than those illustrated in FIG. 3 are also configurable.

Figure 4:
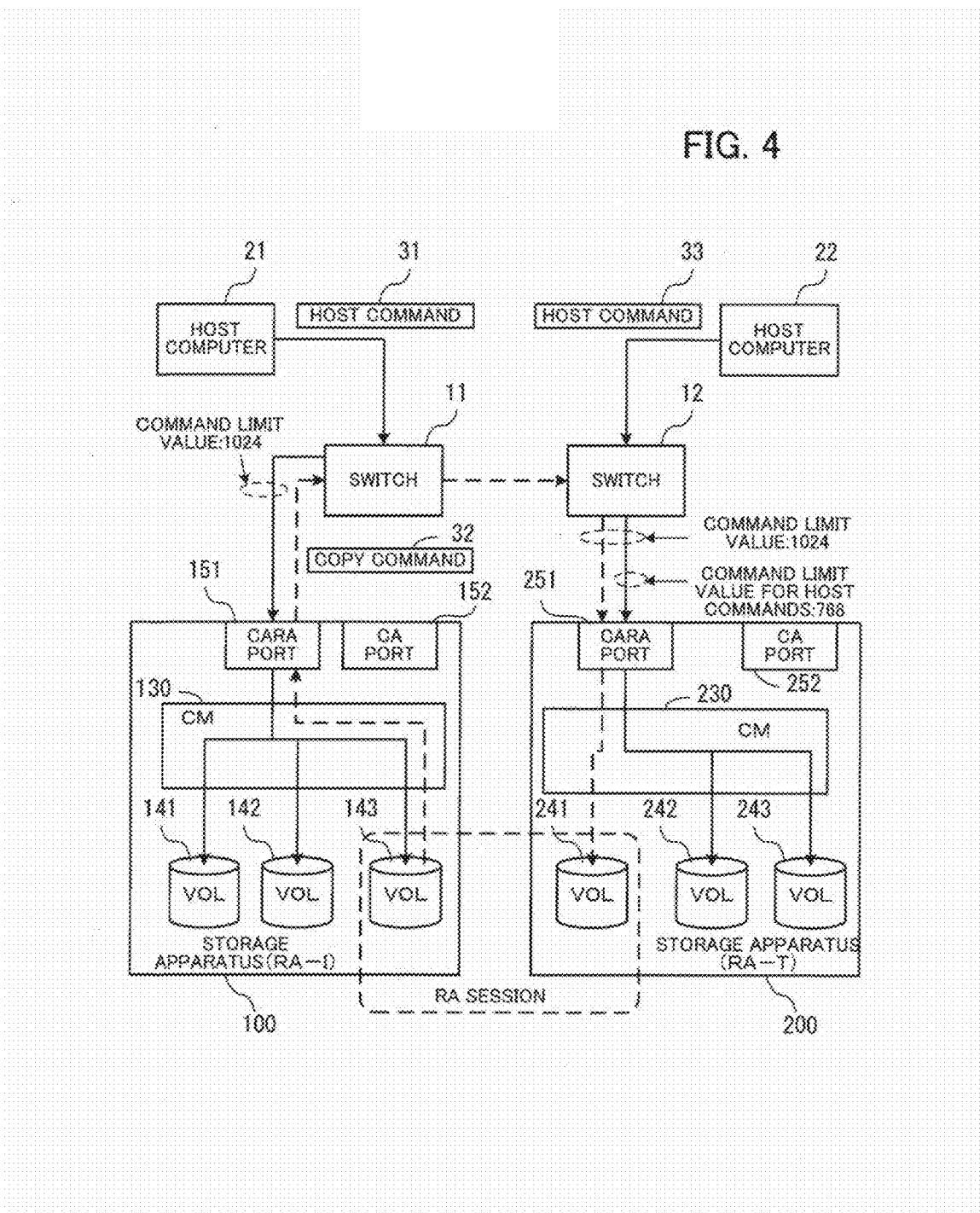
FIG. 4 illustrates an example of a command flow control condition according to the second embodiment.

Next described is a limit on the number of commands according to the second embodiment. FIG. 4 illustrates an example of a command flow control condition according to the second embodiment. The storage apparatus 100 includes a CARA port 151 and a CA port 152. The CARA port 151 is a communication port implemented, for example, by the communication I/F 121 of FIG. 3. In addition, the storage apparatus 100 includes multiple volumes 141, 142, and 143. The volumes 141, 142, and 143 are, for example, logical volumes provided in a RAID group. Alternatively, each of the volumes 141, 142, and 143 may be a single HDD. The storage apparatus 200 includes a CARA port 251 and a CA port 252. The CARA port 251 is a communication port implemented, for example, by the communication I/F 221 of FIG. 3. In addition, the storage apparatus 200 includes multiple volumes 241, 242, and 243. The volumes 241, 242, and 243 are, for example, logical volumes provided in a RAID group. Alternatively, each of the volumes 241, 242, and 243 may be a single HDD.

In the example of FIG. 4, an RA session has been established between the volume 143 of the storage apparatus 100 and the volume 241 of the storage apparatus 200. The RA session is a communication path used for transmission of a copy command 32 which instructs remote access from the storage apparatus 100 to the storage apparatus 200 and copying of data written in the volume 143 to the volume 241. According to the RA session, target volumes for inter-storage apparatus copy (i.e., copy between two storage apparatuses) are defined. The host computer 21 is connected to the CARA port 151 via the switch 11. In the case of accessing data in the volumes 141, 142, and 143 of the storage apparatus 100, the host computer 21 outputs a host command 31. The host command 31 is input to the CARA port 151 of the storage apparatus 100 via the switch 11. In the storage apparatus 100, the CM 130 receives the host command 31 input to the CARA port 151. Subsequently, the CM 130 performs a data access process indicated by the host command 31 on either one of the volumes 141, 142, and 143.

Note that, among host commands, a command to a volume for which an RA session has been established is particularly referred to as the "RA command". In addition, a command to a volume for which an RA session is not established is particularly referred to as the "CA command". In the case when data of the volume 143 is updated according to an RA command, except for the time of initial copy, the copy command 32 is issued in order to bring the volume 241, which is the other chassis for which the RA session has been established, to an equivalent condition to that of the volume 143. That is, as long as no data update takes place in the volume 143 for which the RA session has been established, the copy command 32 is not issued. Note that the initial copy is a copy operation for bringing disks of both the volumes to an equivalent condition at the time of the establishment of the RA session. For example, in the case where the host command instructs data writing to the volume 143, the CM 130 writes data to the volume 143, and also generates the copy command 32 which instructs copying of the written data to the volume 241 of the storage apparatus 200. Subsequently, the CM 130 outputs the generated copy command 32 from the CARA port 151. The copy command 32 is input to the CARA port 251 of the storage apparatus 200 via the switches 11 and 12. In the storage apparatus 200, the copy command 32 input to the CARA port 251 is received by the CM 230. The CM 230 writes data to the volume 241 according to the copy command 32.

Note that the volume 241 is used to store a copy of the data of the volume 143 provided in the storage apparatus 100, and assume here that no access is made from the host computer 22 during normal operation. The host computer 22 is connected to the CARA port 251 via the switch 12. In the case of accessing data in the volumes 242 and 243 of the storage apparatus 200, the host computer 22 outputs a host command 33. The host command 33 is input to the CARA port 251 of the storage apparatus 200 via the switch 12. In the storage apparatus 200, the CM 230 receives the host command 33 input to the CARA port 251. Subsequently, the CM 230 performs a data access process indicated by the host command 33 on either one of the volumes 242 and 243.

Assume in the example of FIG. 4 that each of the storage apparatuses 100 and 200 is able to simultaneously process up to 1024 commands in total, regardless of the types of the commands, with respect to each communication port (the CARA port 151/251 and the CA port 152/252). For example, the CM 130 limits the number of commands input from the CARA port 151 and currently being executed (sometimes hereinafter referred to also as the "command execution count") to up to 1024. Although the CARA port 151 is used also to transmit the copy command 32, the CM 130 does not manage the number of commands to be transmitted, and the number of commands to be transmitted has no effect on the number of received commands. The CM 230 limits the number of commands input from the CARA port 251 and currently being executed to up to 1024. In addition, if the number of commands input from the CARA port 251 and currently being executed is more than or equal to a predetermined threshold, the CM 230 prevents the execution of host commands. For example, when the number of commands is more than or equal to 768, the CM 230 prevents the execution of host commands. Note that, when the command execution count has yet to reach 1024, the CM 230 executes copy commands even if the command execution count is more than or equal to 768.

Figure 5:
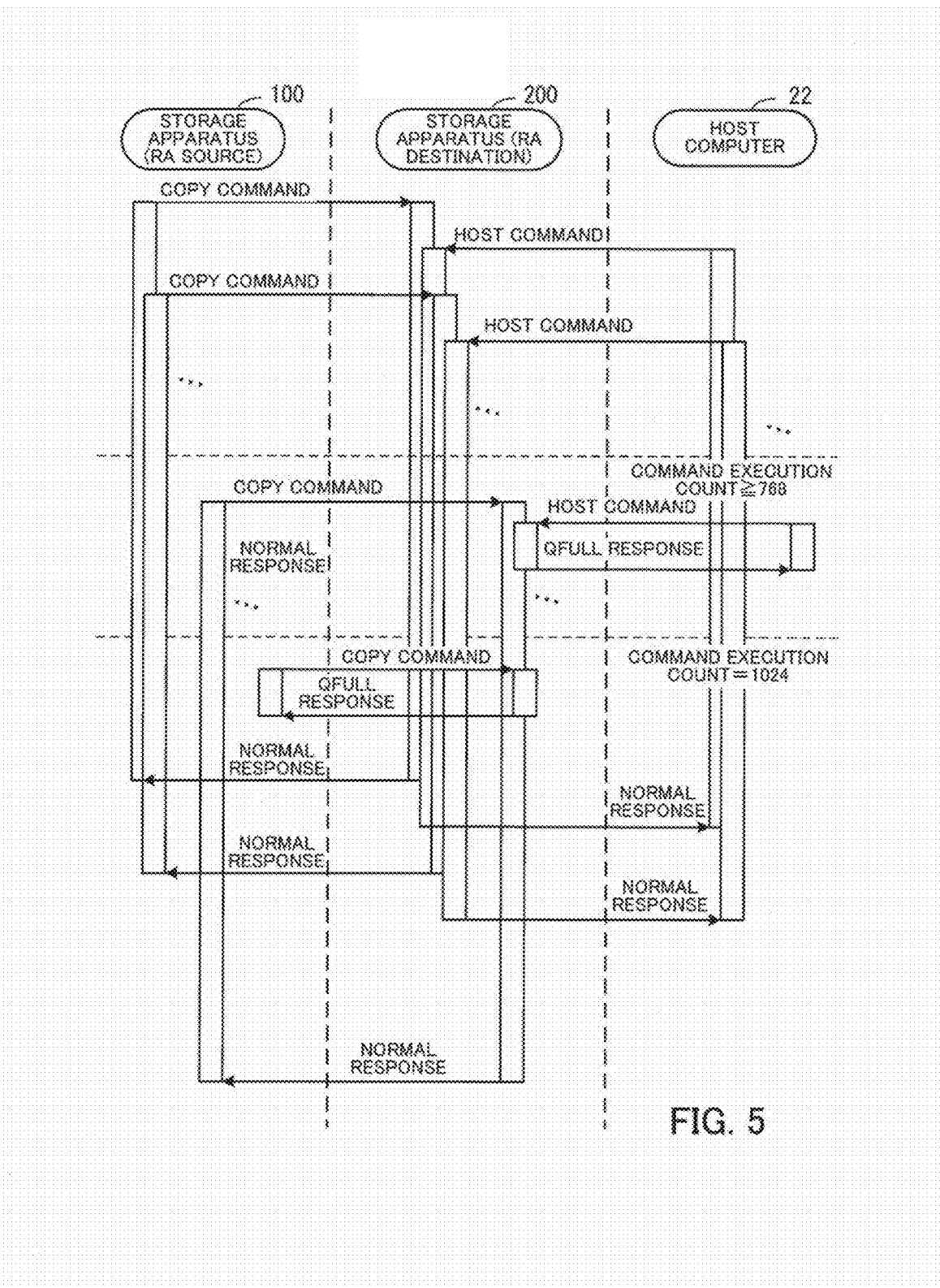
FIG. 5 illustrates the status of command limit implementation in an RA-destination storage apparatus according to the second embodiment.

FIG. 5 illustrates the status of the command limit implementation in an RA-destination storage apparatus according to the second embodiment. Each time, in the RA-source storage apparatus 100, data is written to the volume 143 for which an RA session has been established, a copy command is transmitted from the storage apparatus 100 to the RA-destination storage apparatus 200. In addition, a host command instructing data access to the volumes 242 and 243 of the storage apparatus 200 is transmitted from the host computer 22 to the storage apparatus 200.

In the storage apparatus 200, the number of commands currently being executed (the command execution count), among commands input via the CARA port 251, is counted. Assume here that the command limit value for host commands is "768". In this case, during the period that the command execution count is less than "768", data access is carried out in the storage apparatus 200 according to a newly input command regardless whether the command is a copy command or a host command. When the data access performed according to the command is completed in a normal manner, the storage apparatus 200 transmits a normal response to a source of the command. If a large number of copy commands and host commands are input to the storage apparatus 200 over a short period of time, the command execution count may be more than or equal to "768". In the case where the command execution count is more than or equal to "768", as for a copy command input from the storage apparatus 100, the storage apparatus 200 executes data access according to the copy command. On the other hand, as for a host command input from the host computer 22, the storage apparatus 200 does not execute data access according to the host command and transmits a queue full (QFULL) response to the host computer 22. The QFULL response is a message to notify the command source of command inexecutability due to an excessive command execution count. After receiving the QFULL response, the host computer 22 is able to, for example, retransmit the host command after a lapse of a predetermined period of time. In this manner, the execution of host commands is prevented. Subsequently, if a large number of copy commands are input to the storage apparatus 200 over a short period of time, the command execution count may reach "1024". When the command execution count reaches "1024", the storage apparatus 200 does not execute data access according to a newly input command regardless of the type of the command, and transmits a QFULL response to a source of the command. That is, even if the newly input command is a copy command input from the storage apparatus 100, the storage apparatus 200 does not execute data access according to the copy command and transmits a QFULL response to the storage apparatus 100. After receiving the QFULL response, the storage apparatus 100 is able to, for example, retransmit the copy command after a lapse of a predetermined period of time. In this manner, the execution of any command is prevented.

Each time data access being executed in the storage apparatus 200 is completed, the command execution count is decremented. When the command execution count becomes less than or equal to 1024 and a copy command is then input, the storage apparatus 200 executes data access according to the copy command. Further, when the command execution count becomes less than or equal to 768 and a host command is then input, the storage apparatus 200 executes data access according to the host command. As illustrated in FIG. 5, whether the storage apparatus 200 executes data access according to an input command depends on the type of the command, i.e., a copy command or a host command. Therefore, when a command is input to the storage apparatus 200, it is determined whether the input command is a copy command or a host command. The type of a command may be determined based on an operation code included in the command.

Figure 6:
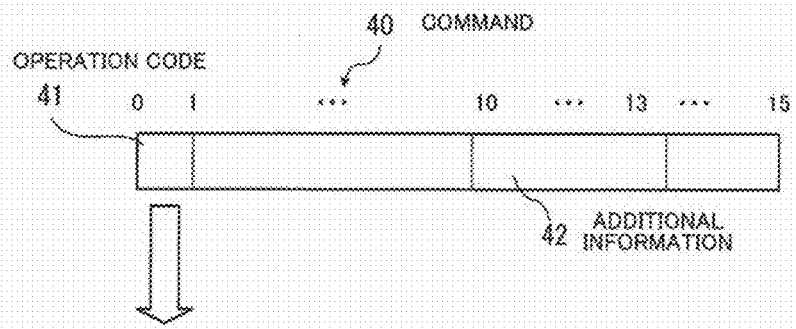
FIG. 6 illustrates an example of a data format of a command.

FIG. 6 illustrates an example of a data format of a command. For example, the storage apparatuses 100 and 200 receive a command called a command descriptor block (CDB) complying with the Small Computer System Interface (SCSI) standard. As for CDB commands, there are 6-byte, 10-byte, 12-byte, and 16-byte commands. At the start of a command 40, a one-byte operation code 41 is set. In the operation code 41, a code for identifying the size and type of the command is set. Commonly used codes include a code indicating whether the command is a read request or a write request and a code for identifying the size of the command. For example, a code "08" indicates that the command is a 6-byte read request; a code "0A" indicates that the command is a 6-byte write request; a code "28" indicates that the command is a 10-byte read request; a code "2A" indicates that the command is a 10-byte write request; a code "A8" indicates that the command is a 12-byte read request; a code "AA" indicates that the command is a 12-byte write request; a code "88" indicates that the command is a 16-byte read request; and a code "8A" indicates that the command is a 16-byte write request. When transmitting a host command requesting data reading or data writing, the host computers 21 and 22 set one of the commonly used codes as the operation code 41. Codes from "D0" onwards used as the operation code 41 are available for vendor unique commands. In the second embodiment, for example, a code "D9" is used to indicate that the command 40 is a copy command. In addition, a code "DD" is used to indicate that the command 40 is a path monitor command. Note that, in the case of a path monitor command, additional information 42 is stored, for example, in the tenth to the thirteenth bytes. The additional information 42 is, for example, an execution status of the command and a command limit value. The storage apparatus 100 sets "D9" in the operation code 41 of a copy command to be transmitted, and sets data to be copied in another area. In addition, the host computers 21 and 22 set a value indicating a read request or a write request, such as "08" and "0A", in the operation code 41 of a host command to be transmitted. The CM 230 manages a command limit value for input commands and the number of commands currently being executed (the command execution count) using, for example, a command management table.

FIG. 7 illustrates an example of the command management table. In a command management table 50, the command limit value and the command execution count are set. Note that the command management table 50 is stored in, for example, the memory 232 of the CM 230. The command limit value is a threshold of the command execution count used as a criterion for determining whether to execute an input command. In the case where the command execution count has reached the command limit value, the execution of an input command is prevented. As for the command limit value, each time the CM 230 receives a command, a value corresponding to the type of the received command is set. For example, in the case of receiving a copy command, the CM 230 sets "1024" as the command limit value. In the case of receiving a host command, the CM 230 sets "768" as the command limit value. The command execution count is the number of commands currently being executed. The commands currently being executed are commands that have been input to the storage apparatus 200 but for each of which a response has yet to be returned to its transmission source. The command execution count is incremented by 1 when the CM 230 receives a command, and is decremented by 1 when the CM 230 transmits a response.

Figure 8:
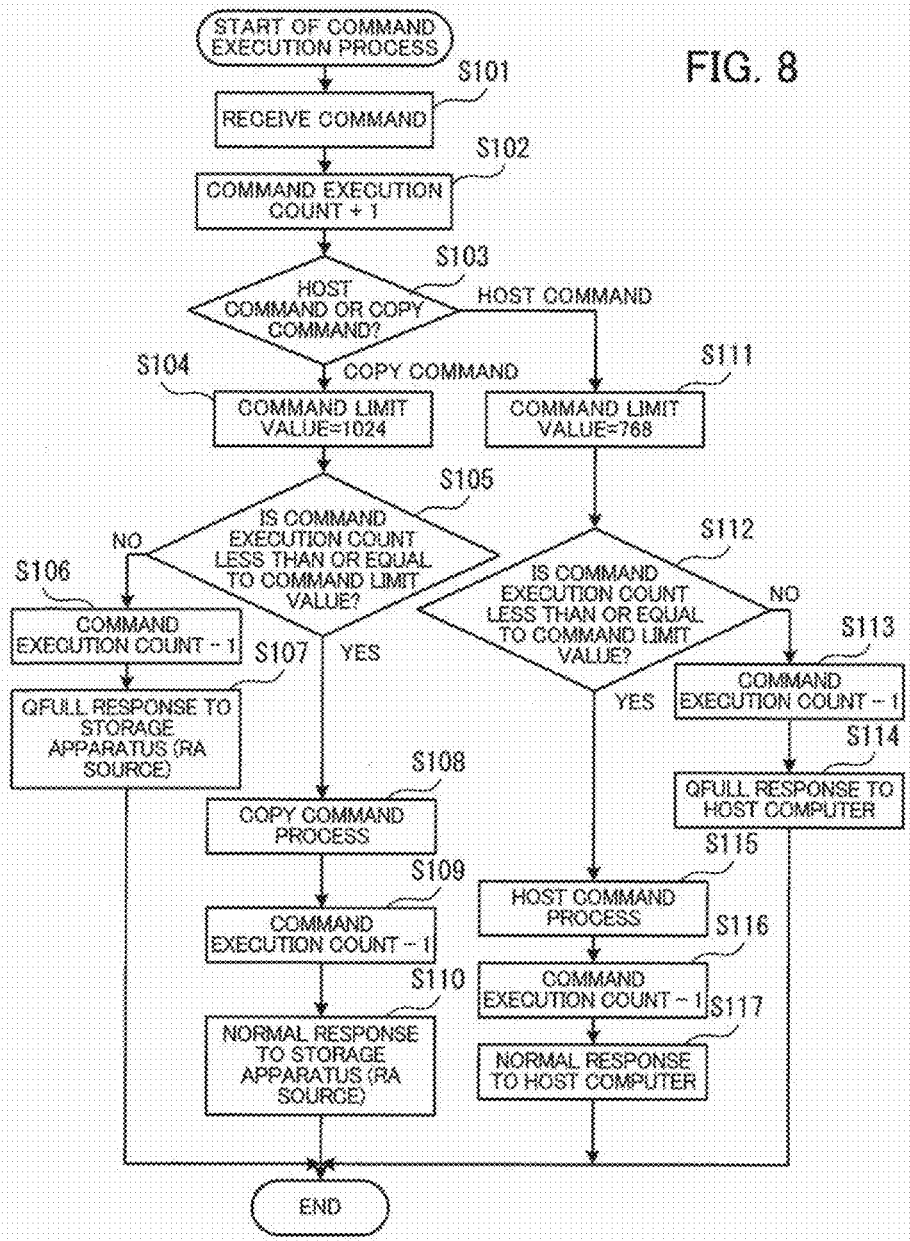
FIG. 8 is a flowchart illustrating a procedure of a command execution process according to the second embodiment.

Next described is a procedure of a command execution process performed by the CM 230 of the storage apparatus 200. FIG. 8 is a flowchart illustrating a procedure of a command execution process according to the second embodiment. The command execution process of FIG. 8 is described next according to the step numbers in the flowchart.

[Step S101] The CM 230 receives a command.

[Step S102] The CM 230 increments the command execution count of the command management table 50 by 1.

[Step S103] The CM 230 determines whether the type of the received command is a host command or a copy command. For example, the CM 230 refers to the operation code of the received command, and determines that the type of the received command is a host command if the operation code is any one of "08", "0A", "28", "2A", "A8", "AA", "88", and "8A". On the other hand, if the operation code of the received command is "D9", the CM 230 determines the type of the received command is a copy command. When the received command is a copy command, the CM 230 advances the process to Step S104. When the received command is a host command, the CM 230 advances the process to Step S111.

[Step S104] In the case of receiving a copy command, the CM 230 sets "1024" as the command limit value in the command management table 50.

[Step S105] By referring to the command management table 50, the CM 230 determines whether or not the command execution count is less than or equal to the command limit value. If the command execution count is less than or equal to the command limit value, the CM 230 advances the process to Step S108. On the other hand, when the command execution count exceeds the command limit value, the CM 230 advances the process to Step S106.

[Step S106] In the case where the command execution count exceeds the command limit value, the CM 230 decrements the command execution count by 1.

[Step S107] The CM 230 transmits a QFULL response to the storage apparatus 100. Subsequently, the command execution process ends.

[Step S108] When the command execution count is less than or equal to the command limit value, the CM 230 executes a process according to the copy command. For example, the CM 230 writes data included in the copy command to the volume 241.

[Step S109] The CM 230 decrements the command execution count by 1.

[Step S110] The CM 230 transmits, to the storage apparatus 100, a normal response indicating that the data writing according to the copy command has been completed in a normal manner. Subsequently, the command execution process ends.

[Step S111] In the case of receiving a host command, the CM 230 sets "768" as the command limit value in the command management table 50.

[Step S112] By referring to the command management table 50, the CM 230 determines whether or not the command execution count is less than or equal to the command limit value. If the command execution count is less than or equal to the command limit value, the CM 230 advances the process to Step S115. On the other hand, when the command execution count exceeds the command limit value, the CM 230 advances the process to Step S113.

[Step S113] In the case where the command execution count exceeds the command limit value, the CM 230 decrements the command execution count by 1.

[Step S114] The CM 230 transmits a QFULL response to the host computer 22. Subsequently, the command execution process ends.

[Step S115] When the command execution count is less than or equal to the command limit value, the CM 230 executes a process according to the host command. For example, if the host command is a read request, the CM 230 reads data indicated by the host command from the volume 242 or 243. If the host command is a write request, the CM 230 writes data indicated by the host command to the volume 242 or 243.

[Step S116] The CM 230 decrements the command execution count by 1.

[Step S117] The CM 230 transmits, to the host computer 22, a normal response indicating that the data access according to the host command has been completed in a normal manner. Note that, in the case where the host command is a read request, the normal response includes the read data. Subsequently, the command execution process ends.

As has been described above, in the RA-destination storage apparatus 200 according to the second embodiment, the command limit value for copy commands with respect to each port is 1024 while the command limit value for host commands with respect to each port is 768. With this, even when the load due to host commands is high, at least 256 command slots are allocated for copy commands. This prevents copy process operations between the storage apparatuses 100 and 200 from being suspended. That is, a reduction in the processing efficiency of the copy process operations is prevented. Note that, in the case where the number of host commands is less than 768, 256 or more copy commands may be executed.

(c) Third Embodiment

The third embodiment is related to dynamic flow control of host commands and copy commands. Note that the system configuration of the third embodiment is the same as that of the second embodiment illustrated in FIGS. 2 and 3. In addition, the memory 232 of the CM 230 in the storage apparatus 200 according to the third embodiment stores the command management table 50 of FIG. 7. According to the second embodiment described above, in the case where the number of copy commands received per unit time is small, the command execution count is less than 1024 in total even if a large number of host commands are generated. Accordingly, performance per port is reduced in the case where there are a small number of copy commands compared to the case where the command limit value for host commands is set to the same as the command limit value for copy commands (for example, 1024). Assume, for example, that the command limit value for host commands is set to 768. In this case, although an ability to execute 1024 commands in total is provided with respect to each port, 1024 commands cannot be executed when the execution count of copy commands is less than 256. In view of the above, according to the third embodiment, the limit value for host command is set not to 768 but to 1024 in the case where no copy command is issued immediately. The case where no copy command is issued immediately is a case in which a process performed in advance of transmitting a copy command has yet to be carried out. For example, in order to transmit a copy command, establishment of a communication path for the copy command, such as establishment of an RA session for a copy operation between storage apparatuses, is made in advance. Accordingly, it may be determined that no copy command is issued immediately in the case where establishment of a communication path, such as an RA session, has yet to be made.

Figure 9:
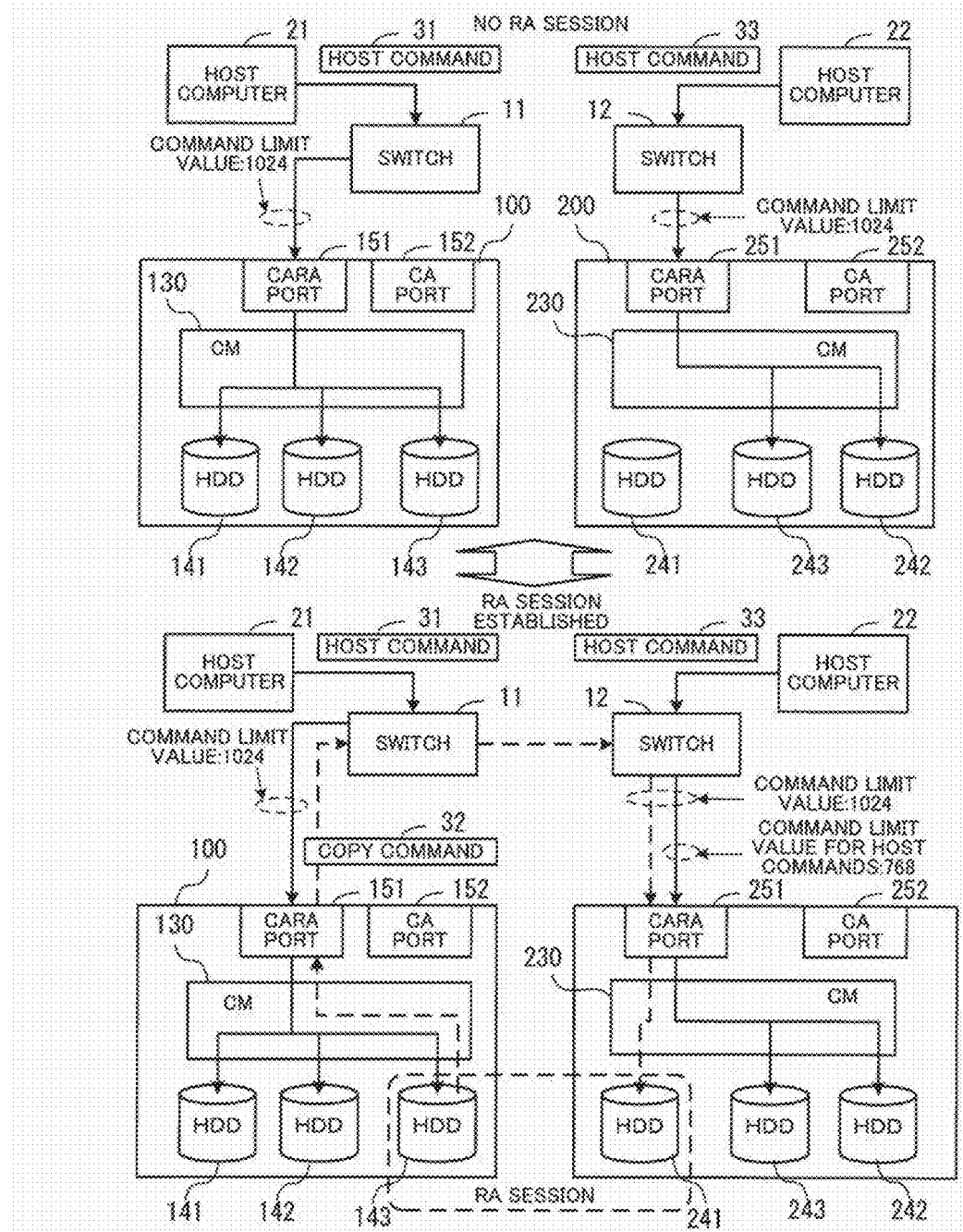
FIG. 9 illustrates an example of a command flow control condition according to a third embodiment.

FIG. 9 illustrates an example of a command flow control condition according to the third embodiment. In FIG. 9, the upper part illustrates a command flow control condition at the time when an RA session is not established, and the lower part illustrates a command flow control condition at the time when an RA session has been established. In the case where an RA session is not established, the individual storage apparatuses 100 and 200 apply 1024 as the command limit values for all types of commands input via the CARA ports 151 and 251. In the case where an RA session has been established, the storage apparatus 200 sets only the command limit value for host commands to 768. The command limit value for commands other than host commands is 1024. Whether an RA session has been established is managed by, for example, a session management table.

FIG. 10 illustrates an example of a session management table according to the third embodiment. In a session management table 60, columns of RA-source volume number, RA-destination volume number, and session type are provided. In each field of the RA-source volume number column, an identification number (volume number) of an RA-source volume in a copy operation is set. Specifically, the identification number is assigned to identify the volume in an RA-source storage apparatus to which the volume belongs. In each field of the RA-destination volume number column, an identification number (volume number) of an RA-destination volume in a copy operation is set. Specifically, the identification number is assigned to identify the volume in an RA-destination storage apparatus to which the volume belongs. In each field of the session type column, the type of a session is set. In the case of a session used for data copy between volumes of different storage apparatuses (remote copy), the term "remote copy session" is set in a corresponding field of the session type column. In the case of a session used for data copy between different volumes in a single storage apparatus (local copy), the term "local copy session" is set in a corresponding field of the session type column. Note that, in the case of a remote copy session, an identifier of an apparatus (apparatus ID) to be a copy destination is also set. The session management table as illustrated in FIG. 10 is stored, for example, in the memory 232 of the CM 230 in the storage apparatus 200.

Figure 11:
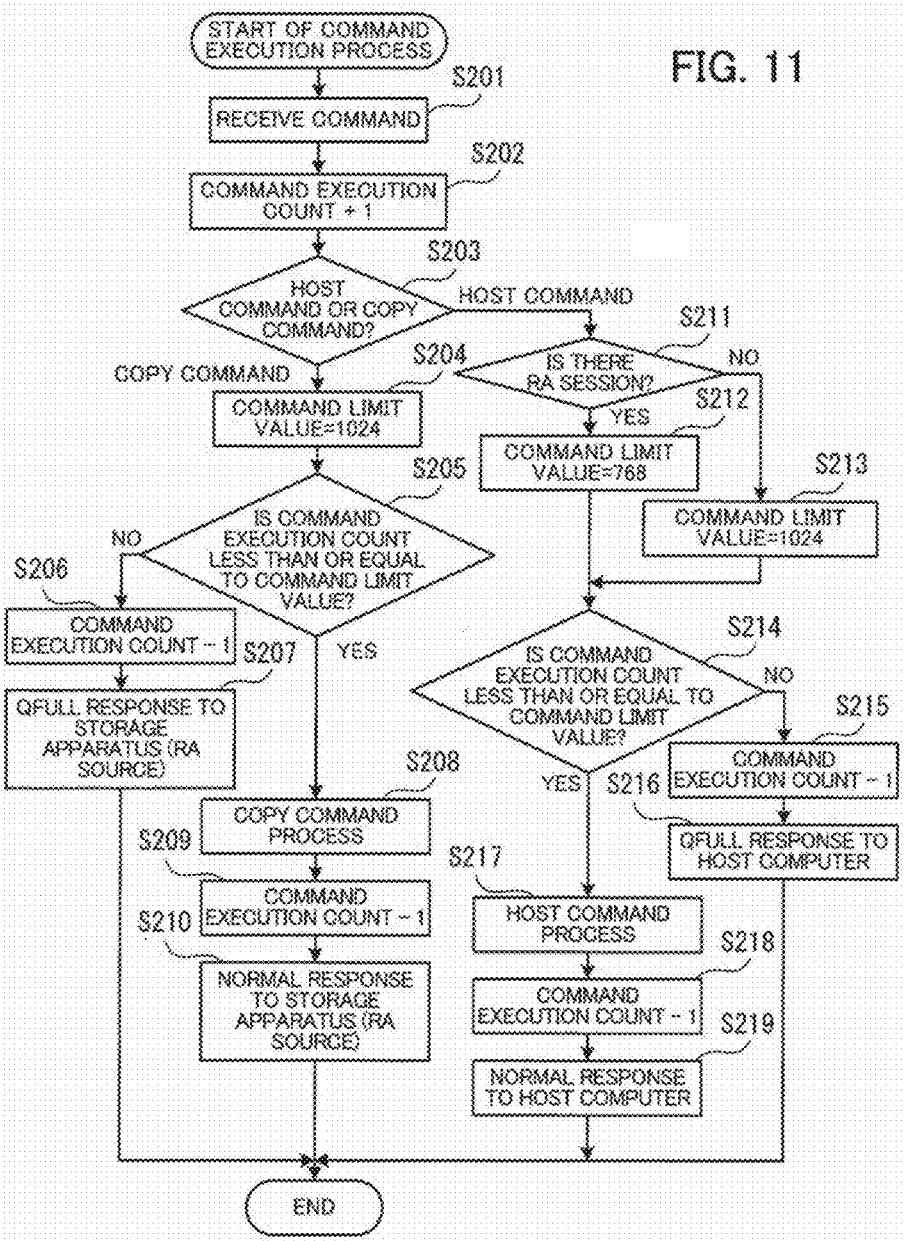
FIG. 11 is a flowchart illustrating a procedure of a command execution process according to the third embodiment.

Next described is a command execution process performed in the storage apparatus 200. FIG. 11 is a flowchart illustrating a procedure of a command execution process according to the third embodiment. The command execution process of FIG. 11 is described next according to the step numbers in the flowchart. Among steps illustrated in FIG. 11, operations of Steps S201 to S210 and Steps S214 to S219 are the same as those of Steps S101 to S110 and Step S112 to S117, respectively, of the second embodiment in FIG. 8. Accordingly, the following gives a description of Steps S211 to S213, which are different operations from those of the second embodiment.

[Step S211] In the case where the received command is a host command, the CM 230 of the storage apparatus 200 determines the presence or absence of an RA session. For example, by referring to the session management table 60, the CM 230 determines the presence of an RA session if at least one RA session has been established. In the case of determining the presence of an RA session, the CM 230 advances the process to Step S212. On the other hand, if determining the absence of an RA session, the CM 230 advances the process to Step S213.

[Step S212] When an RA session has been established, the CM 230 sets the command limit value for host commands to 768. Subsequently, the CM 230 advances the process to Step S214.

[Step S213] When an RA session is not established, the CM 230 sets the command limit value for host commands to 1024.

Subsequently, due to the operation of Step S214, whether to execute the received host command is determined according to whether or not the command execution count is less than or equal to the set command limit value. As a result, when there is no RA session, the same value as the command limit value for copy commands is applied to the command limit value for host commands. By performing the command flow control in the above-described manner, 1024 is applied also to the command limit value for host commands in the case when no copy command is received immediately. This improves processing efficiency.

(d) Forth Embodiment

Next described is a forth embodiment. The fourth embodiment relates to dynamic flow control in consideration of the ratio of copy commands to host commands. Note that the system configuration of the fourth embodiment is the same as that of the second embodiment illustrated in FIGS. 2 and 3. According to the second and third embodiments, a reduction in the processing efficiency of copy commands is prevented in the case where the number of host commands issued to the RA-destination storage apparatus 200 becomes excessively large. However, the second and third embodiment do not give consideration to the case where the number of copy commands becomes excessively large. As a result, there is a possibility that, in the RA-destination storage apparatus 200, the entire 1024 command slots indicated by the command limit value are dedicated to copy commands and, therefore, not even one host command can be executed. In view of the above, according to the fourth embodiment, individual command limit values for copy commands and host commands are set based on the ratio of the number of copy commands to the number of host commands received by the storage apparatus 200. This prevents an increase in imbalance between the processing efficiency of copy commands and the processing efficiency of host commands in the case when the number of copy commands has increased.

Figure 12:
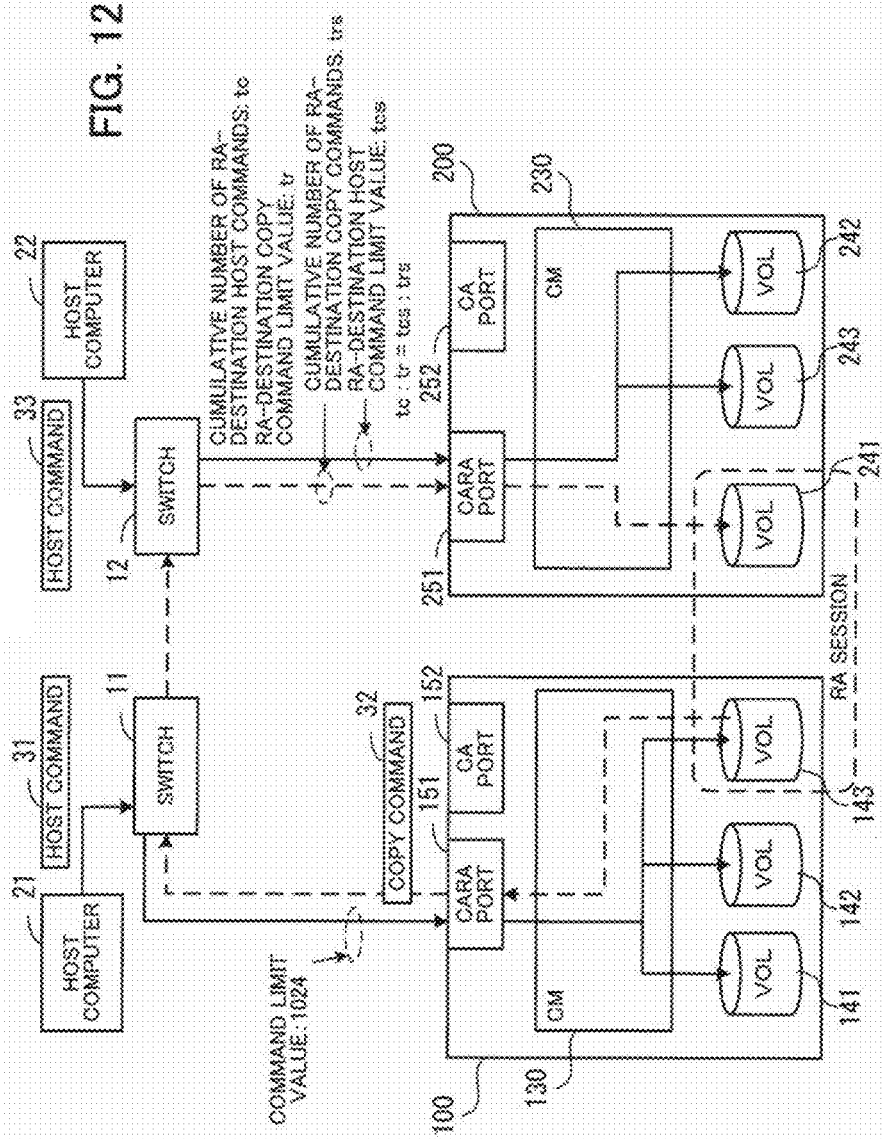
FIG. 12 illustrates an example of a command flow control condition according to a fourth embodiment.

FIG. 12 illustrates an example of a command flow control condition according to the fourth embodiment. According to the fourth embodiment, in the RA-destination storage apparatus 200, a cumulative number of RA-destination host commands tc and a cumulative number of RA-destination copy commands tr are counted for a predetermined period of time (for example, 10 seconds). Note that the cumulative number of RA-destination host commands tc is the number of host commands received by the storage apparatus 200 within the predetermined period of time, and includes host commands which were not executed and for each of which a QFULL response has been returned. Similarly, the cumulative number of RA-destination copy commands tr is the number of copy commands received by the storage apparatus 200 within the predetermined period of time, and includes copy commands which were not executed and for each of which a QFULL response has been returned.

Assume here that, in the RA-source storage apparatus 100, the command limit value for commands received from the CARA port 151 is set to 1024. In the case where the host command 31 input to the CARA port 151 from the host computer 21 is a command indicating data writing to the volume 143, a data copy operation corresponding to the host command 31 takes place. In this case, a response to the host command 31 is output after the storage apparatus 100 receives, from the storage apparatus 200, a response to the corresponding copy command 32. Therefore, the input host command 31 is in execution until the completion of the data copy process. Based on the ratio of the cumulative number of RA-destination host commands tc to the cumulative number of RA-destination copy commands tr, the CM 230 of the storage apparatus 200 determines a ratio of an RA-destination host command limit value tcs to an RA-destination copy command limit value trs. The following are calculation formulae.

$$tcs=(tc/(tc+tr))\times 1024 \quad (1)$$

$$trs=1024-tcs \quad (2)$$

Assume, for example, that the cumulative number of RA-destination host commands tc is "2000" and the cumulative number of RA-destination copy commands tr is "1024". In this case, the RA-destination host command limit value tcs and the RA-destination copy command limit value trs take the following values, respectively.

$$tcs=677$$

$$trs=347$$

By exerting control in this way, it is possible to achieve a balanced process between copy commands and host commands even if a large number of copy commands are received.

Information used for dynamic flow control in consideration of the ratio of copy commands to host commands is set in a command management table.

FIG. 13 illustrates an example of a command management table according to the fourth embodiment. In a command management table 51, the following items are set: a host command execution count; the cumulative number of RA-destination host commands tc; the RA-destination host command limit value tcs; a copy command execution count; the cumulative number of RA-destination copy commands tr; and the RA-destination copy command limit value trs. Note that the command management table 51 is stored, for example, in the memory 232 of the CM 230. The host command execution count is the number of host commands currently being executed. The cumulative number of RA-destination host commands tc is the number of host commands received within a predetermined period of time. The RA-destination host command limit value tcs is a value indicating the upper limit of the host command execution count in the storage apparatus 200. If the host command execution count has reached the RA-destination host command limit value tcs, the execution of an input host command is prevented. The copy command execution count is the number of copy commands currently being executed. The cumulative number of RA-destination copy commands tr is the number of copy commands received within a predetermined period of time. The RA-destination copy command limit value trs is a value indicating the upper limit of the copy command execution count in the storage apparatus 200. If the copy command execution count has reached the RA-destination copy command limit value trs, the execution of an input copy command is prevented.

Figure 14:
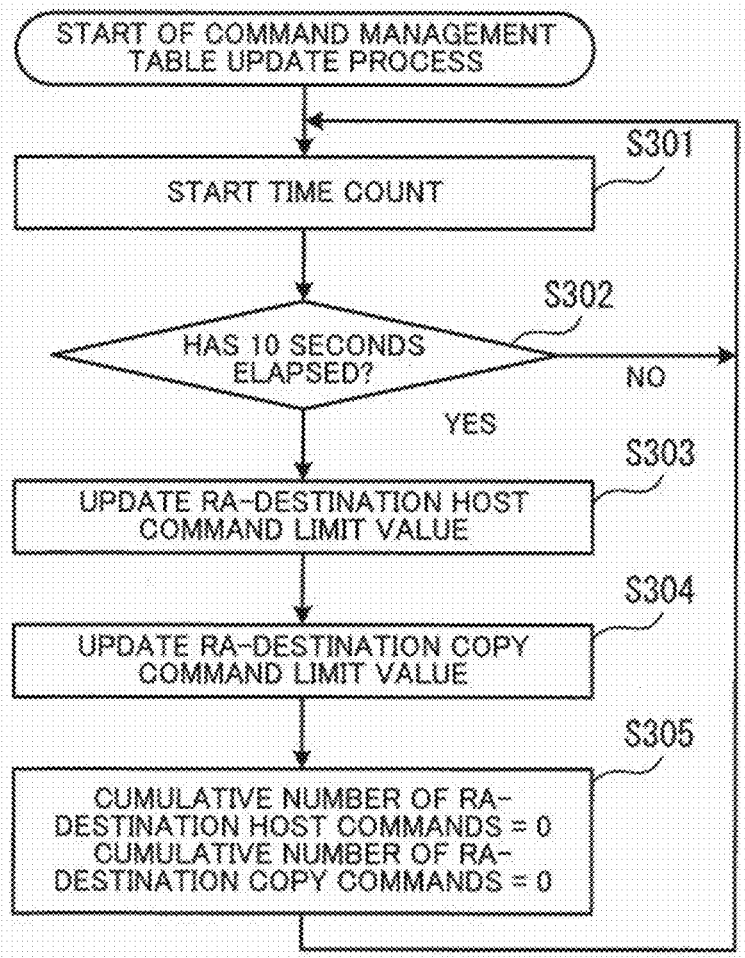
FIG. 14 is a flowchart illustrating a procedure of a command management table update process according to the fourth embodiment.

The RA-destination host command limit value tcs and the RA-destination copy command limit value trs of the command management table 51 of FIG. 13 are updated at intervals of, for example, 10 seconds. Next described is an update process of the command management table 51. FIG. 14 is a flowchart illustrating a procedure of a command management table update process according to the fourth embodiment. The command management table update process of FIG. 14 is described next according to the step numbers in the flowchart.

[Step S301] The CM 230 resets a timer and starts time count.

[Step S302] The CM 230 determines whether the timer has counted 10 seconds. If 10 seconds has yet to elapse, the CM 230 advances the process to Step S301. If 10 seconds has elapsed, the CM 230 advances the process to Step S303.

[Step S303] The CM 230 updates the RA-destination host command limit value tcs. For example, by referring to the command management table 51, the CM 230 acquires the cumulative number of RA-destination host commands tc and the cumulative number of RA-destination copy commands tr. Subsequently, the CM 230 calculates the RA-destination host command limit value tcs based on Equation (1). Then, the CM 230 updates the RA-destination host command limit value tcs stored in the command management table 51 with the calculated RA-destination host command limit value tcs.

[Step S304] The CM 230 updates the RA-destination copy command limit value trs. For example, by referring to the command management table 51, the CM 230 acquires the RA-destination host command limit value tcs. Subsequently, the CM 230 calculates the RA-destination copy command limit value trs based on Equation (2). Then, the CM 230 updates the RA-destination copy command limit value trs stored in the command management table 51 with the calculated RA-destination copy command limit value trs.

[Step S305] The CM 230 initializes the cumulative number of RA-destination host commands tc and the cumulative number of RA-destination copy commands tr of the command management table 51 to zero. Subsequently, the CM 230 advances the process to Step S301.

In the above-described manner, the update of the RA-destination host command limit value tcs and the RA-destination copy command limit value trs based on the cumulative number of RA-destination host commands tc and the cumulative number of RA-destination copy commands tr obtained during the immediately preceding 10 seconds is repeated at intervals of 10 seconds.

Figure 15:
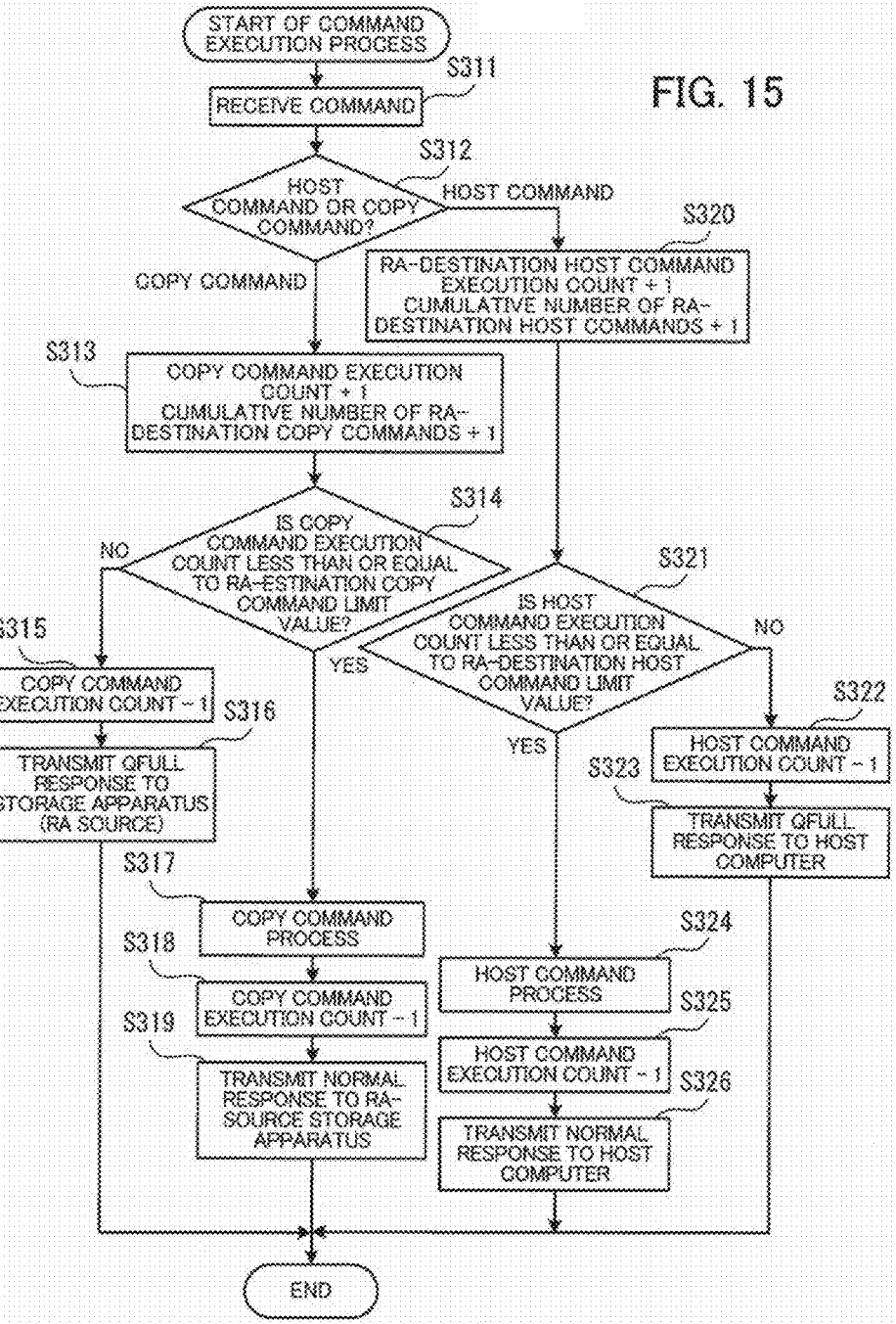
FIG. 15 is a flowchart illustrating an example of a procedure of a command execution process according to the fourth embodiment.

Next described is a command execution process performed in the storage apparatus 200 according to the fourth embodiment. FIG. 15 is a flowchart illustrating an example of a procedure of the command execution process according to the fourth embodiment. The command execution process of FIG. 15 is described next according to the step numbers in the flowchart.

[Step S311] The CM 230 receives a command.

[Step S312] The CM 230 determines whether the type of the received command is a host command or a copy command. The command type may be determined based on, for example, the operation code of the received command. When the received command is a copy command, the CM 230 advances the process to Step S313. When the received command is a host command, the CM 230 advances the process to Step S320.

[Step S313] In the case of receiving a copy command, the CM 230 increments the value of the copy command execution count of the command management table 51 by 1. In addition, the CM 230 increments the value of the cumulative number of RA-destination copy commands tr by 1.

[Step S314] By referring to the command management table 51, the CM 230 determines whether or not the copy command execution count is less than or equal to the RA-destination copy command limit value trs. When the copy command execution count is less than or equal to the RA-destination copy command limit value trs, the CM 230 advances the process to Step S317. On the other hand, when the copy command execution count exceeds the RA-destination copy command limit value trs, the CM 230 advances the process to Step S315.

[Step S315] When the copy command execution count exceeds the RA-destination copy command limit value trs, the CM 230 decrements the copy command execution count by 1.

[Step S316] The CM 230 transmits a QFULL response to the storage apparatus 100. Subsequently, the command execution process ends.

[Step S317] When the copy command execution count is less than or equal to the RA-destination copy command limit value trs, the CM 230 executes a process according to the copy command.

[Step S318] The CM 230 decrements the copy command execution count by 1.

[Step S319] The CM 230 transmits, to the storage apparatus 100, a normal response indicating that data writing according to the copy command has been completed in a normal manner. Subsequently, the command execution process ends.

[Step S320] In the case of receiving a host command, the CM 230 increments the value of the host command execution count of the command management table 51 by 1. In addition, the CM 230 increments the value of the cumulative number of RA-destination host commands tc by 1.

[Step S321] By referring to the command management table 51, the CM 230 determines whether or not the host command execution count is less than or equal to the RA-destination host command limit value tcs. If the host command execution count is less than or equal to the RA-destination host command limit value tcs, the CM 230 advances the process to Step S324. On the other hand, when the host command execution count exceeds the RA-destination host command limit value tcs, the CM 230 advances the process to Step S322.

[Step S322] When the host command execution count exceeds the RA-destination host command limit value tcs, the CM 230 decrements the host command execution count by 1.

[Step S323] The CM 230 transmits a QFULL response to the host computer 22. Subsequently, the command execution process ends.

[Step S324] When the host command execution count is less than or equal to the RA-destination host command limit value tcs, the CM 230 executes a process according to the host command.

[Step S325] The CM 230 decrements the host command execution count by 1.

[Step S326] The CM 230 transmits, to the host computer 22, a normal response indicating that data access according to the host command has been completed in a normal manner. Subsequently, the command execution process ends.

By exerting control in this way, it is possible to achieve a balanced process between copy commands and host commands even if a large number of copy commands are received.

(e) Fifth Embodiment

Next described is a fifth embodiment. The fifth embodiment is related to dynamic flow control in consideration of the cumulative number of commands on the RA-source side. Note that the system configuration of the fifth embodiment is the same as that of the second embodiment illustrated in FIGS. 2 and 3. The fourth embodiment does not take into account the cumulative number of RA-source commands when calculating the RA-destination copy command limit value trs and the RA-destination host command limit value tcs of the RA-destination storage apparatus 200. The cumulative number of RA-destination copy commands tr, which is taken into consideration at the time of calculation of the RA-destination copy command limit value trs and the RA-destination host command limit value tcs of the storage apparatus 200, is obtained after a command limit value of 1024 is set for the RA-source CARA port 151. On the other hand, the cumulative number of RA-destination host commands tc related to host commands input to the storage apparatus 200 includes host commands for each of which a QFULL response has been returned, and is not influenced by the command limit. Accordingly, balanced command execution is not achieved when the number of host commands input to the storage apparatus 100 has reached or exceeded 1024 and the cumulative number of RA-destination copy commands tr is counted with the imposition of the command limit value and, then, the number of host commands input to the storage apparatus 200 is more than or equal to 1024. That is, in the storage apparatus 200, host commands are executed in preference to copy commands. In order to solve this problem, the fifth embodiment uses the cumulative number of RA-source host commands for calculating the RA-destination copy command limit value trs and the RA-destination host command limit value tcs of the RA-destination storage apparatus 200.

Figure 16:
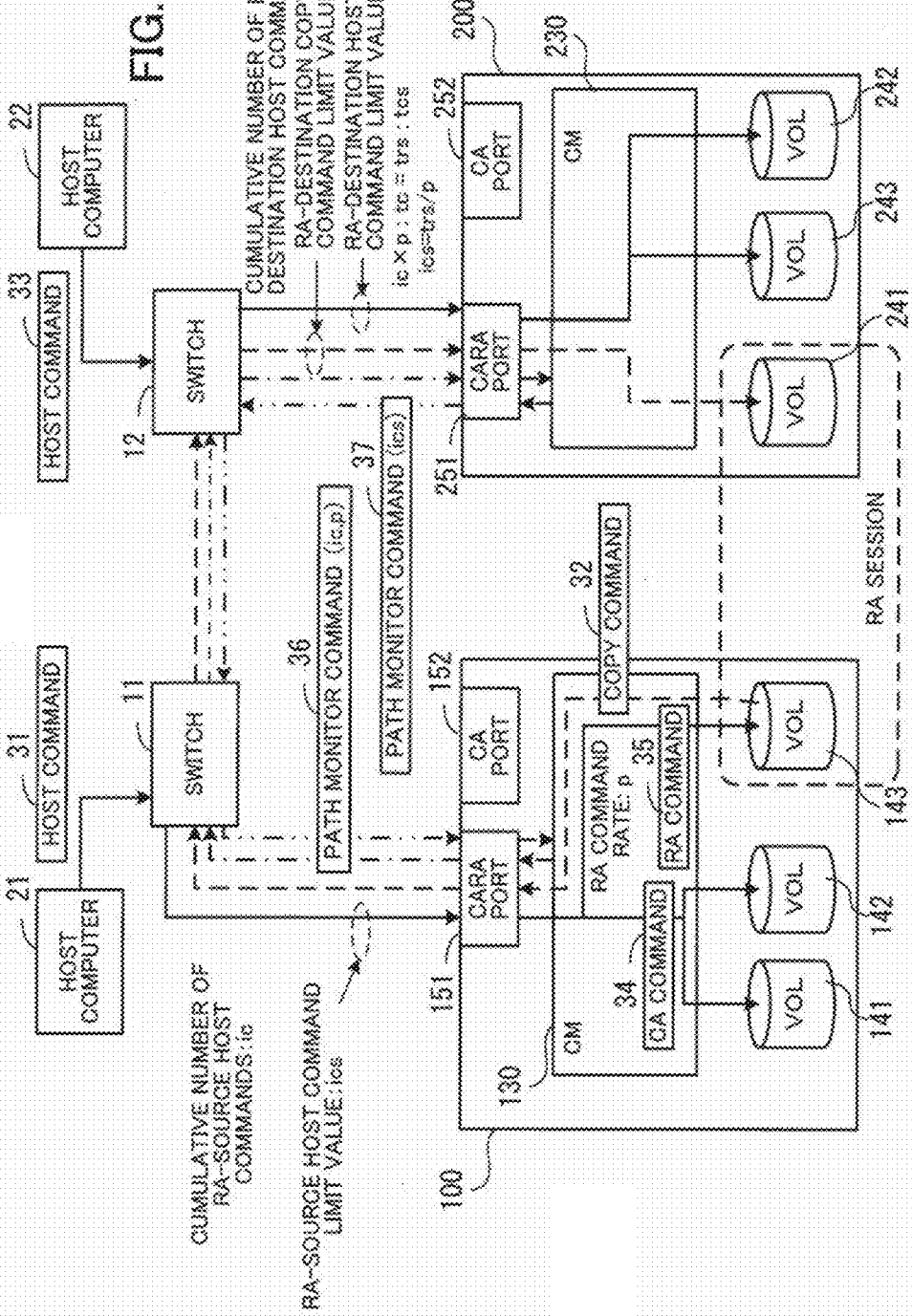
FIG. 16 illustrates an example of a command flow control condition according to a fifth embodiment.

FIG. 16 illustrates an example of a command flow control condition according to the fifth embodiment. According to the fifth embodiment, the RA-source storage apparatus 100 notifies the RA-destination storage apparatus 200 of information indicating an RA command count. For example, the CM 130 of the storage apparatus 100 counts the number of host commands input to the storage apparatus 100 (a cumulative number of RA-source host commands, ic) at regular time intervals (for example, 10 seconds). In addition, the CM 130 determines an access destination of the host command 31, with which access to one of the volumes 141 to 143 has been executed. If the access destination is either the volume 141 or 142 for which an RA session is not established, the CM 130 determines that the executed host command 31 is a CA command 34. On the other hand, if the access destination is the volume 143 for which an RA session has been established, the CM 130 determines that the executed host command 31 is an RA command 35. Subsequently, the CM 130 calculates the proportion of RA commands 35 to the total number of host commands 31 executed within a predetermined period of time (for example, 10 seconds). This rate is referred to as an RA command rate p. Note that when the RA command 35 is executed, data is written to the volume 143 by the CM 130 if the RA command 35 is a write command requesting data writing. Subsequently, the CM 130 issues the copy command 32. The issued copy command 32 transmits to the storage apparatus 200 via the switches 11 and 12 and the like. Then, the CM 130 transmits a path monitor command 36 including the cumulative number of RA-source host commands ic and the RA command rate p to the storage apparatus 200. For example, the CM 130 transmits the path monitor command 36 to which the additional information 42 (see FIG. 6) is added at regular time intervals (for example, 10 seconds). The additional information 42 includes the cumulative number of RA-source host commands ic and the RA command rate p.

By the path monitor command 36 including the cumulative number of RA-source host command ic and the RA command rate p, the RA-destination storage apparatus 200 side is able to know an input condition of RA-source commands. In the RA-destination storage apparatus 200, the CM 230 counts the cumulative number of RA-destination host commands tc based on commands input to the CARA port 251. Subsequently, the CM 230 calculates the RA-destination host command limit value tcs and the RA-destination copy command limit value trs based on the cumulative number of RA-destination host commands tc and information indicated by the path monitor command 36. The following are calculation formulae.

$$is \times p : tc = trs : tcs \quad (3)$$

$$tcs + trs = 1024 \quad (4)$$

The following results are obtained from these two formulae.

$$tcs = (tc / (tc + ic \times p)) \times 1024 \quad (5)$$

$$trs = 1024 - tcs \quad (6)$$
$$= (ic \times p / (tc + ic \times p)) \times 2024$$

Further, use of the information also allows the RA-source host command limit value ics of the RA-source storage apparatus 100 to be a value reflecting the condition of the RA-destination storage apparatus 200. For example, the RA-source host command limit value ics of the storage apparatus 100 may be calculated using the following calculation formula.

$$ics = trs/p \quad (7)$$

For example, the storage apparatus 200 calculates the RA-source host command limit value ics and transmits, to the storage apparatus 100, a path monitor command 37 including the calculated RA-source host command limit value ics as additional information. After receiving the path monitor command 37, the storage apparatus 100 applies the RA-source host command limit value ics indicated by the path monitor command 37 to limit the execution of host commands input from the CARA port 151. Thus, by taking into account the command input condition of the RA source, host commands are processed in equal measure in both the storage apparatuses 100 and 200 even when more than 1024 commands are input to each of the storage apparatuses 100 and 200.

Next, the host command execution performance of the individual storage apparatuses 100 and 200 according to the fifth embodiment is described using specific examples. The first example illustrates the case of "$ic \times (1-p) \le tc$". "$ic \times (1-p)$" is the number of CA commands input to the RA-source storage apparatus 100 within a predetermined period of time (a cumulative number of CA commands). That is, "$ic \times (1-p) \le tc$" indicates the case where the cumulative number of CA commands input to the storage apparatus 100 is less than or equal to the cumulative number of RA-destination host commands tc input to the storage apparatus 200. Assume here that individual measured values are as follows.

Cumulative number of RA-source host commands ic: 3000
RA command rate p: 0.5
Cumulative number of RA-destination host commands tc: 2000

Then, the RA-destination host command limit value tcs, the RA-destination copy command limit value trs, and the RA-source host command limit value ics are as follows.

$$tcs = (2000/(2000+3000 \times 0.5)) \times 1024 = 585$$

$$trs = 1024 - 585 = 439$$

$$ics = 439/0.5 = 878$$

In this case, if the number of host commands output from the host computer 21 per unit time is substantially constant, the number of host commands input to the storage apparatus 100 in excess of the RA-source host command limit value ics is found by: $ic - ics = 2122$. Similarly, if the number of host commands output from the host computer 22 per unit time is substantially constant, the number of host commands input to the storage apparatus 200 in excess of the RA-destination host command limit value tcs is found by: $tc - tcs = 1415$. In this case, the probability of QFULL responses being returned to each of the host computers 21 and 22 (QFULL rate), which have transmitted host commands, is as follows, and it is seen that the storage apparatuses 100 and 200 exhibit equal host command execution performance.

$$2122/3000 = 0.707 = 70.7\%$$

$$1415/2000 = 0.707 = 70.7\%$$

The second example illustrates the case of "$ic \times (1-p) > tc$". "$ic \times (1-p) > tc$" indicates the case where the number of CA commands input to the storage apparatus 100 is more than the cumulative number of RA-destination host commands tc input to the storage apparatus 200. Assume here that individual measured values are as follows.

Cumulative number of RA-source host commands ic: 2000
RA command rate p: 0.4
Cumulative number of RA-destination host commands tc: 1000

Then, the RA-destination host command limit value tcs, the RA-destination copy command limit value trs, and the RA-source host command limit value ics are as follows.

$$tcs=(1000/(1000+2000\times 0.4))\times 1024=568$$

$$trs=1024-568=456$$

$$ics=456/0.4=1140>1024$$

Thus, ics exceeds 1024. Accordingly, in the case of "ic× (1−p)>tc", the following calculation formulae are used with ics set to 1024.

$$ics=1024 \qquad (8)$$

$$trs=ics\times p \qquad (9)$$

$$tcs=(tc/ic)\times 1024 \qquad (10)$$

Then, the values of the RA-destination copy command limit value trs and the RA-destination host command limit value tcs are changed as follows.

$$trs=1024\times 0.4=409$$

$$tcs=1000/2000\times 1024=512$$

In this case, is−ics=976 and tc−tcs=488. The QFULL rate of each of the storage apparatuses 100 and 200 is as follows, and the storage apparatuses 100 and 200 exhibit equal host command execution performance.

$$976/2000=0.488=48.8\%$$

$$488/1000=0.488=48.8\%$$

Note that, in the fifth embodiment, the host command 31 is input to the CARA port 151 of the RA-source storage apparatus 100, and the copy command 32 output from the CARA port 151 is received by the CARA port 251 of the storage apparatus 200. Thus, such commands input and output via the CARA port are monitoring targets for the command condition of each of the storage apparatuses 100 and 200. The host command 31 may be input not to the CARA port 151 but to the CA port 152. Host commands input to the CA port 152 are not monitoring targets according to the fifth embodiment. In addition, the copy command 32 may be output not from the CARA port 151 of the storage apparatus 100 but from an RA port. Copy commands output from an RA port are not monitoring targets according to the fifth embodiment. Further, in the RA-destination storage apparatus 200, the copy command 32 may be received not by the CARA port 251 but by an RA port. Copy commands received by an RA port are not monitoring targets according to the fifth embodiment. Thus, commands input and output via dedicated ports are not monitoring targets for determining the command input and output condition of each storage apparatus according to the fifth embodiment.

Next described are command management tables individually held by the RA-source storage apparatus 100 and the RA-destination storage apparatus 200 in order to implement the function of the fifth embodiment. FIG. 17 illustrates an example of an RA-source command management table. The storage apparatus 100 includes an RA-source command management table 52. The RA-source command management table 52 is stored in, for example, a memory of the CM 130. In the RA-source command management table 52, the following items are set: the host command execution count; the cumulative number of RA-source host commands ic; the RA-source host command limit value ics; the RA command count; and the RA command rate p. The host command execution count is the number of host commands currently being executed in the RA-source storage apparatus 100. The cumulative number of RA-source host commands ic is the number of host commands input to the RA-source storage apparatus 100 within a predetermined period of time. The RA-source host command limit value ics is a value indicating the upper limit of the host command execution count of the RA-source storage apparatus 100. The RA command count is the number of RA commands, which are requests for access to a volume for which an RA session has been established, among host commands input to the RA-source storage apparatus 100 within the predetermined period of time. The RA command rate p is the proportion of the RA commands to the host commands input to the RA-source storage apparatus 100 within the predetermined period of time.

FIG. 18 illustrates an example of an RA-destination command management table. The storage apparatus 200 includes an RA-destination command management table 53. The RA-destination command management table 53 is stored in, for example, a memory of the CM 230. In the RA-destination command management table 53, the following items are set: the host command execution count; the cumulative number of RA-destination host commands tc; the RA-destination host command limit value tcs; the copy command execution count; the cumulative number of RA-destination copy commands tr; the RA-destination copy command limit value trs; the cumulative number of RA-source host commands ic; and the RA command rate p. The host command execution count is the number of host commands currently being executed in the storage apparatus 200. The cumulative number of RA-destination host commands tc is the number of host commands received by the storage apparatus 200 within a predetermined period of time. The RA-destination host command limit value tcs is a value indicating the upper limit of the host command execution count of the storage apparatus 200. The copy command execution count is the number of copy commands currently being executed in the storage apparatus 200. The cumulative number of RA-destination copy commands tr is the number of copy commands received by the storage apparatus 200 within the predetermined period of time. The RA-destination copy command limit value trs is a value indicating the upper limit of the copy command execution count of the storage apparatus 200. If the copy command execution count has reached the RA-destination copy command limit value trs, the execution of an input copy command is prevented. The cumulative number of RA-source host commands ic is the number of host commands input to the RA-source storage apparatus 100 within the predetermined period of time. The RA command rate p is the proportion of RA commands to host commands input to the storage apparatus 100.

Figure 19:
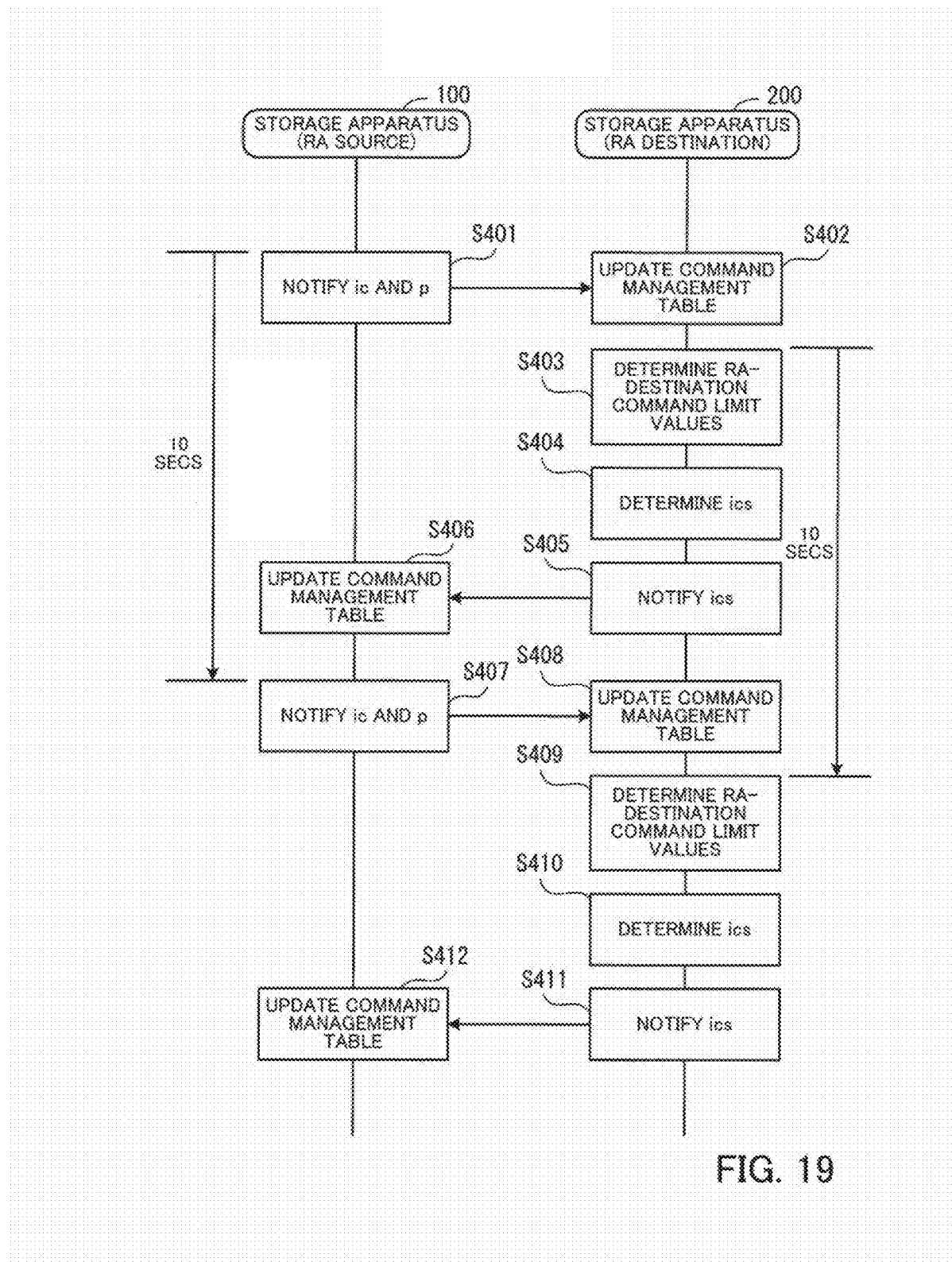
FIG. 19 is a sequence diagram illustrating an example of an information exchange procedure between storage apparatuses.

Next described is an information exchange procedure between storage apparatuses using path monitor commands. FIG. 19 is a sequence diagram illustrating an example of the information exchange procedure between storage apparatuses. The information exchange procedure of FIG. 19 is described next according to the step numbers in the sequence diagram.

[Step S401] The RA-source storage apparatus 100 notifies the storage apparatus 200 of the cumulative number of RA-source host commands ic and the RA command rate p using a path monitor command. For example, when 10 seconds has elapsed after the last notification of the cumulative number of RA-source host commands ic and the RA command rate p, the storage apparatus 100 performs the operation of Step S401.

[Step S402] The storage apparatus 200 updates the values of the cumulative number of RA-source host commands ic and the RA command rate p of the RA-destination command management table 53 with the acquired cumulative number of RA-source host commands ic and RA command rate p.

[Step S403] The storage apparatus 200 performs an RA-destination command limit value determining process. For example, when 10 seconds has elapsed after the last RA-destination command limit value determining process, the storage apparatus 200 calculates the RA-destination host command limit value tcs and the RA-destination copy command limit value trs.

[Step S404] The storage apparatus 200 determines the RA-source host command limit value ics based on the updated RA-destination copy command limit value trs.

[Step S405] Using a path monitor command, the storage apparatus 200 notifies the storage apparatus 100 of the determined RA-source host command limit value ics.

[Step S406] The storage apparatus 100 updates the value of the RA-source host command limit value ics of the RA-source command management table 52 with the acquired RA-source host command limit value ics.

After that, the same operations (Steps S407 to S412) as Steps S401 to S406 are repeated at intervals of seconds. In this manner, the two storage apparatuses 100 and 200 exchange information, which allows fair command execution so as to prevent exceptionally preferential execution of only a certain type of commands.

Figure 20:
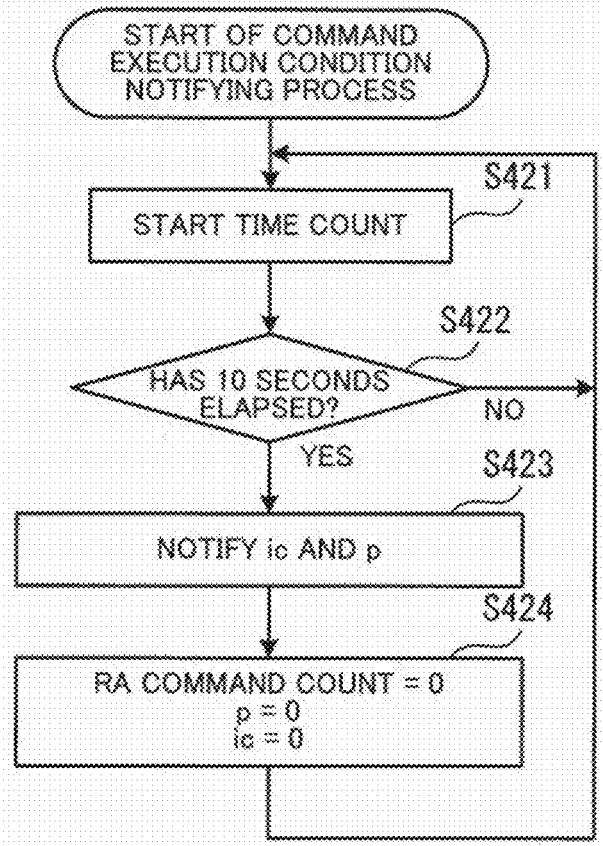
FIG. 20 is a flowchart illustrating an example of a procedure of a command execution condition notifying process in an RA source.

Next, a command execution condition notifying process (the operation of Step S401) in the RA-source storage apparatus 100 is described in detail. FIG. 20 is a flowchart illustrating an example of a procedure of the command execution condition notifying process in the RA source. The command execution condition notifying process of FIG. 20 is described next according to the step numbers in the flowchart.

[Step S421] The CM 130 of the storage apparatus 100 resets a timer and starts time count.

[Step S422] The CM 130 determines whether the timer has counted 10 seconds. If 10 seconds has yet to elapse, the CM 130 advances the process to Step S421. If 10 seconds has elapsed, the CM 130 advances the process to Step S423.

[Step S423] The CM 130 notifies the storage apparatus 200 of the cumulative number of RA-source host commands ic and the RA command rate p. For example, the CM 130 acquires the cumulative number of RA-source host commands ic and the RA command rate p from the RA-source command management table 52. Next, the CM 130 generates a control packet which includes the acquired cumulative number of RA-source host commands ic and RA command rate p in its header. Then, the CM 130 transmits the generated control packet to the storage apparatus 200 via the CA RA port 151.

[Step S424] The CM 130 initializes all the values of the RA command count, the RA command rate p, and the cumulative number of RA-source host commands ic to 0. Subsequently, the CM 130 advances the process to Step S421.

In this manner, information is transmitted from the storage apparatus 100 to the storage apparatus 200 at intervals of 10 seconds.

Figure 21:
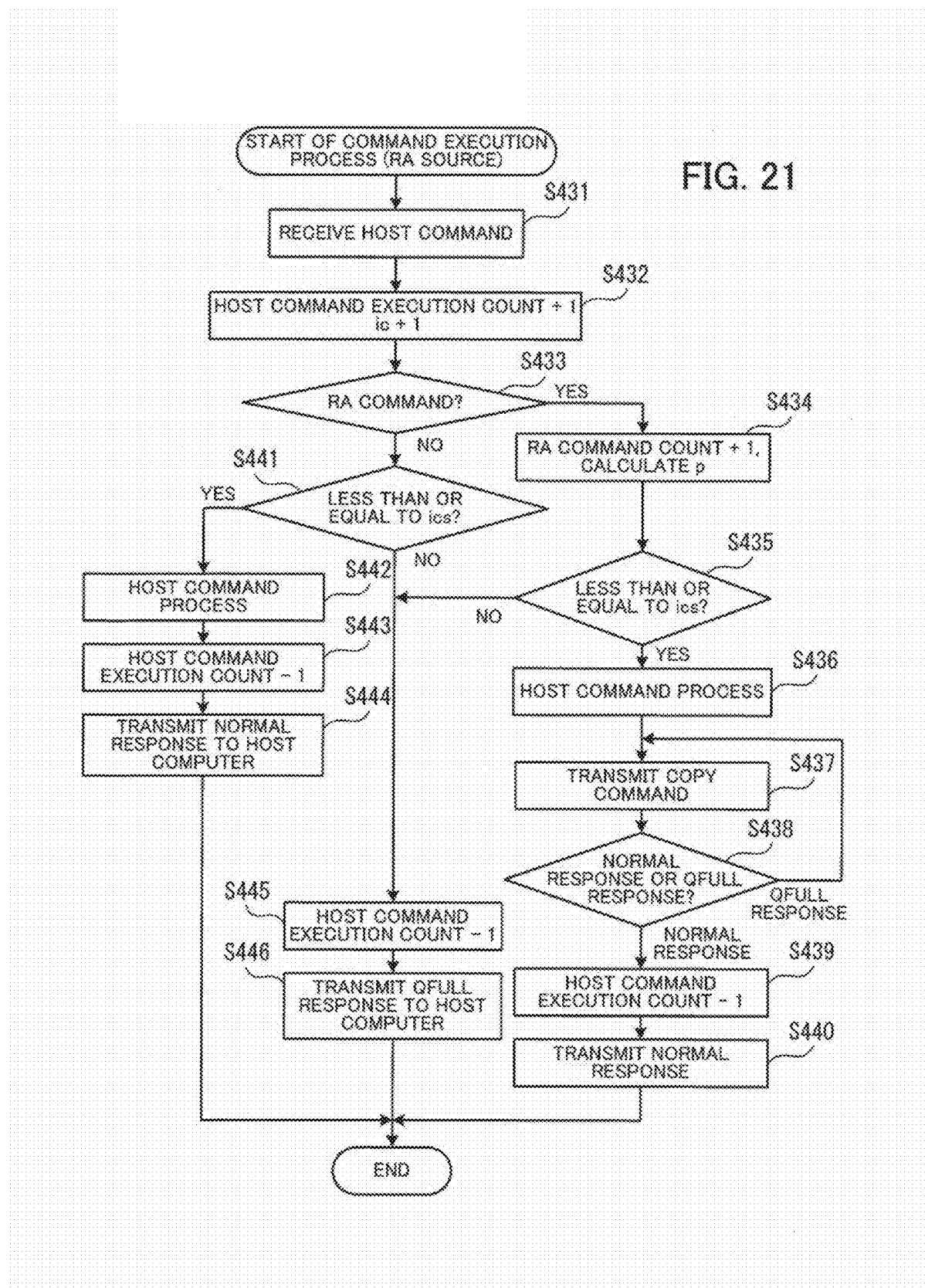
FIG. 21 illustrates an example of a procedure of a command execution process in an RA-source storage apparatus according to the fifth embodiment.

Next described is a command execution process performed in the RA-source storage apparatus. FIG. 21 illustrates an example of a procedure of a command execution process in an RA-source storage apparatus according to the fifth embodiment. The command execution process of FIG. 21 is described next according to step numbers.

[Step S431] The CM 130 receives a host command.

[Step S432] The CM 130 increments each of the host command execution count and the cumulative number of RA-source host commands ic by 1. For example, the CM 130 adds 1 to the value of the host command execution count of the RA-source command management table 52. In addition, the CM 130 adds 1 to the value of the cumulative number of RA-source host commands ic of the RA-source command management table 52.

[Step S433] The CM 130 determines whether the type of the received host command is an RA command. For example, if the host command is a request for accessing the volume 143 for which an RA session has been established, the CM 130 determines that the host command is an RA command. When the host command is an RA command, the CM 130 advances the process to Step S434. On the other hand, when the host command is a CA command, the CM 130 advances the process to Step S441.

[Step S434] The CM 130 increments the RA command count by 1. In addition, based on the RA command count after the increment, the CM 130 calculates the RA command rate p. For example, the CM 130 adds 1 to the value of the RA command count of the RA-source command management table 52. Next, the CM 130 acquires the RA command count and the cumulative number of RA-source host commands ic from the RA-source command management table 52. Then, the CM 130 divides the RA command count by the cumulative number of RA-source host commands ic to thereby obtain the RA command rate p. The CM 130 updates the RA command rate p of the RA-source command management table 52 with the calculated RA command rate p.

[Step S435] The CM 130 determines whether the host command execution count is less than or equal to the RA-source host command limit value ics. For example, the CM 130 acquires the host command execution count and the RA-source host command limit value ics from the RA-source command management table 52 and compares these acquired values. When the host command execution count is less than or equal to the RA-source host command limit value ics, the CM 130 advances the process to Step S436. On the other hand, when the host command execution count exceeds the RA-source host command limit value ics, the CM 130 advances the process to Step S445.

[Step S436] The CM 130 executes a process according to the received host command. For example, the CM 130 writes data to the volume 143.

[Step S437] The CM 130 transmits, to the storage apparatus 200, the copy command 32 for copying data written in Step S436 to the storage apparatus 200.

[Step S438] The CM 130 determines whether a response from the storage apparatus 200 is a normal response or a QFULL response. When receiving a normal response from the storage apparatus 200, the CM 130 advances the process to Step S439. On the other hand, when receiving a QFULL response from the storage apparatus 200, the CM 130 advances the process to Step S437 and retransmits the copy command 32.

[Step S439] The CM 130 decrements the value of the host command execution count of the RA-source command management table 52 by 1.

[Step S440] The CM 130 transmits a normal response to the host computer 21. Subsequently, the command execution process ends.

[Step S441] When the received host command is a CA command, the CM 130 determines whether the host command execution count is less than or equal to the RA-source host command limit value ics. When the host command execution count is less than or equal to the RA-source host command limit value ics, the CM 130 advances the process to Step S442. On the other hand, when the host command execution count exceeds the RA-source host command limit value ics, the CM 130 advances the process to Step S445.

[Step S442] The CM 130 executes a process according to the received host command. For example, the CM 130 writes data to the volume 141 or 142.

[Step S443] The CM 130 decrements the value of the host command execution count of the RA-source command management table 52 by 1.

[Step S444] The CM 130 transmits a normal response to the host computer 21. Subsequently, the command execution process ends.

[Step S445] When the host command execution count exceeds the RA-source host command limit value ics, the CM 130 decrements the value of the host command execution count of the RA-source command management table 52 by 1.

[Step S446] The CM 130 transmits a QFULL response to the host computer 21. Subsequently, the command execution process ends.

In this manner, also in the RA-source storage apparatus 100, the host command execution count is adequately controlled by the RA-source host command limit value ics, which is dynamically changed according to the RA-destination copy command limit value trs.

Figure 22:
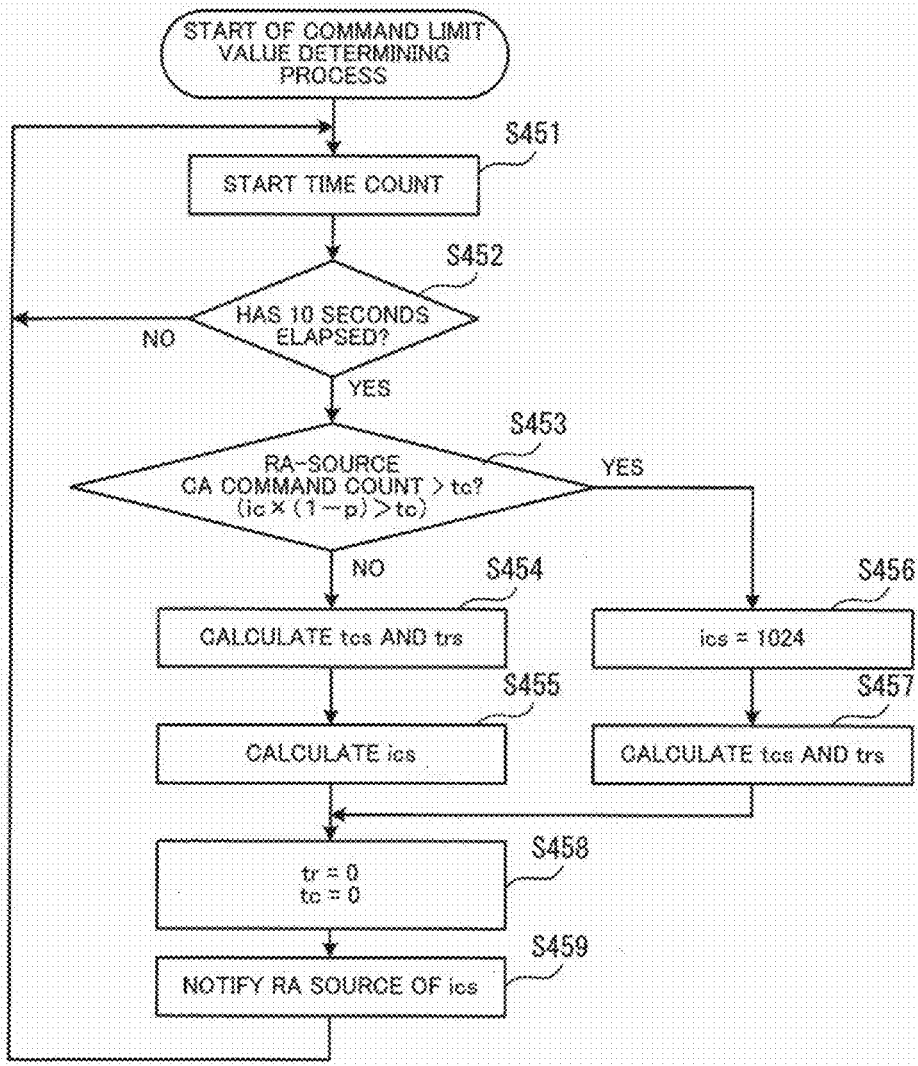
FIG. 22 illustrates an example of a procedure of a command limit value determining process in an RA destination.

Next described is a process performed in the RA-destination storage apparatus 200. FIG. 22 illustrates an example of a procedure of a command limit value determining process in an RA destination. The command limit value determining process of FIG. 22 is described next according to step numbers.

[Step S451] The CM 230 of the storage apparatus 200 resets a timer and starts time count.

[Step S452] The CM 230 determines whether the timer has counted 10 seconds. If 10 seconds has yet to elapse, the CM 230 advances the process to Step S451. If 10 seconds has elapsed, the CM 230 advances the process to Step S453.

[Step S453] The CM 230 determines whether the CA command count of the RA-source storage apparatus 100 is larger than the cumulative number of RA-destination host commands tc. The RA-source CA command count is calculated by multiplying the cumulative number of RA-source host commands ic by "1−RA command rate p". For example, the CM 230 obtains the cumulative number of RA-destination host commands tc, the cumulative number of RA-source host commands ic, and the RA command rate p from the RA-destination command management table 53. Subsequently, the CM 230 compares the value obtained by multiplying the cumulative number of RA-source host commands ic by "1−RA command rate p" to the cumulative number of RA-destination host commands tc, to thereby determine whether the CA command count is larger than the cumulative number of RA-destination host commands tc. When the CA command count is larger than the cumulative number of RA-destination host commands tc, the CM 230 advances the process to Step S456. On the other hand, when the CA command count is less than or equal to the cumulative number of RA-destination host commands tc, the CM 230 advances the process to Step S454.

[Step S454] When the CA command count is less than or equal to the cumulative number of RA-destination host commands tc, the CM 230 calculates the RA-destination host command limit value tcs and the RA-destination copy command limit value trs. For example, the CM 230 acquires the cumulative number of RA-source host commands ic, the RA command rate p, and the cumulative number of RA-destination host commands tc from the RA-destination command management table 53. Subsequently, the CM 230 calculates the RA-destination host command limit value tcs and the RA-destination copy command limit value trs according to the above Equations (5) and (6). Further, the CM 230 updates the RA-destination host command limit value tcs and the RA-destination copy command limit value trs of the RA-destination command management table 53 with the calculated RA-destination host command limit value tcs and RA-destination copy command limit value trs.

[Step S455] The CM 230 calculates the RA-source host command limit value ics. For example, the CM 230 acquires the RA-destination copy command limit value trs and the RA command rate p from the RA-destination command management table 53. Then, the CM 230 calculates the RA-source host command limit value ics according to the above Equation (7). Subsequently, the CM 230 advances the process to Step S458.

[Step S456] When the CA command count is larger than the cumulative number of RA-destination host commands tc, the CM 230 determines that the RA-source host command limit value ics is "1024".

[Step S457] The CM 230 calculates the RA-destination host command limit value tcs and the RA-destination copy command limit value trs. For example, the CM 230 acquires the cumulative number of RA-source host commands ic, the RA command rate p, and the cumulative number of RA-destination host commands tc from the RA-destination command management table 53. Subsequently, the CM 230 calculates the RA-destination host command limit value tcs and the RA-destination copy command limit value trs according to the above Equations (9) and (10) using the acquired values and the RA-source host command limit value "ics=1024" determined in Step S456. Further, the CM 230 updates the values of the RA-destination host command limit value tcs and the RA-destination copy command limit value trs of the RA-destination command management table 53 with the calculated RA-destination host command limit value tcs and RA-destination copy command limit value trs.

[Step S458] The CM 230 initializes the cumulative number of RA-destination host commands tc and the cumulative number of RA-destination copy commands tr of the RA-destination command management table 53 to 0.

[Step S459] The CM 230 notifies the RA-source storage apparatus 100 of the RA-source host command limit value ics calculated in Step S455 or the RA-source host command limit value ics determined in Step S456. For example, the CM 230 transmits, to the storage apparatus 100, the path monitor command 37 which includes the RA-source host command limit value ics in its header. Subsequently, the CM 230 advances the process to Step S451.

In the above-described manner, both the RA-source and RA-destination command limit values are calculated in the storage apparatus 200. Note that the command execution process of the RA-destination storage apparatus 200 according to the fifth embodiment is the same as the command execution process according to the fourth embodiment illustrated in FIG. 15. In the above-described manner, the command limit values determined in the RA-destination storage apparatus 200 are applied to the individual storage apparatuses 100 and 200. As a result, even when the number of host commands input to the storage apparatus 100 exceeds the RA-source host command limit value ics, it is possible to allow the storage apparatuses 100 and 200 to have equivalent host command processing efficiency. That is, taking into consideration also an excessive number of host commands being input to the RA-source storage apparatus 100, a reduction in host command processing efficiency due to data copying in an RA session is made comparable between the RA source and the RA destination, to thereby achieve fairness between the RA source and the RA destination. Note that the fifth embodiment illustrates an example in which the storage apparatuses are connected one-to-one with each other, however, the fifth embodiment may be applied to where one storage apparatus is connected to multiple storage apparatuses or where multiple storage apparatuses are connected to multiple storage apparatuses. Further, instead of equally handling host commands output from each of the host computers 21 and 22, execution of the host commands issued from the individual host computers 21 and 22 may be weighted according to their priority. By weighting, it is possible to control the probability of QFULL responses being returned to the host computers 21 and 22.

(f) Sixth Embodiment

Next described is a sixth embodiment. The sixth embodiment takes into account a difference in the processing time of a CA command and an RA command in the RA-source storage apparatus 100. Note that the system configuration of the sixth embodiment is the same as that of the second embodiment illustrated in FIGS. 2 and 3. As for an RA command, a response is transmitted to the host computer 21 after the end of remote copy which is initiated as an extension of the process of data writing to the volume 143. Accordingly, an RA command requires longer time to complete the process compared to a CA command. However, the fifth embodiment does not take into account the difference in the processing time between a CA command and an RA command. As a result, only CA commands may be processed in the RA-source storage apparatus 100 while the processes of an increasing number of RA commands remain incomplete. This may cause inability of receiving even CA commands. In view of this, in the sixth embodiment, weighting according to the difference in the command processing time is applied and command limit values are changed in such a manner as not to accumulate incomplete processes of RA commands.

Figure 23:
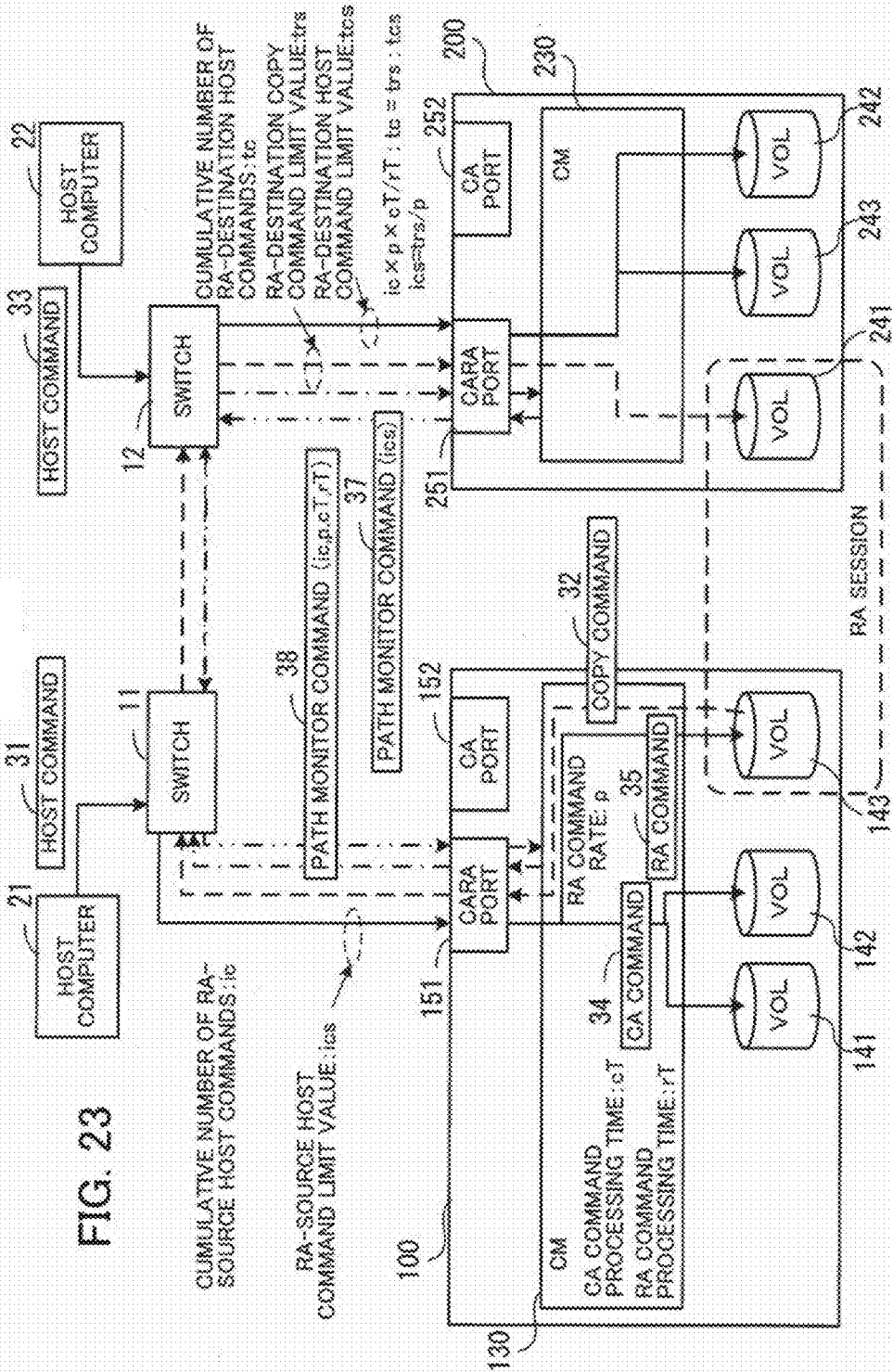
FIG. 23 illustrates an example of a command flow control condition according to a sixth embodiment.

FIG. 23 illustrates an example of a command flow control condition according to the sixth embodiment. According to the sixth embodiment, in the RA-source storage apparatus 100, a CA command processing time cT and an RA command processing time rT are measured. The measured CA command processing time cT and RA command processing time rT are transmitted to the RA-destination storage apparatus 200 by a path monitor command 38 together with the cumulative number of RA-source host commands ic and the RA command rate p. In the storage apparatus 200, command limit values are determined using the CA command processing time cT and the RA command processing time rT. For example, the following calculations are carried out.

$$ic \times p \times cT/rT:tc = trs:tcs \quad (11)$$

$$tcs + trs = 1024 \quad (12)$$

The following results are obtained from these two equations.

$$tcs = (tc/(tc + ic \times p \times cT/rT)) \times 1024 \quad (13)$$

$$trs = 1024 - tcs \quad (14)$$
$$= ((ic \times p \times cT/rT)/(tc + ic \times p \times cT/rT)) \times 2024$$

Further, the RA-source host command limit value ics of the storage apparatus 100 is calculated using the following calculation formula.

$$ics = trs/p \quad (15)$$

Next, host command execution performance of the individual storage apparatuses 100 and 200 according to the sixth embodiment is described using specific examples.

Assume here that individual measured values are as follows.

Cumulative number of RA-source host commands ic: 3000
RA command rate p: 0.5
Cumulative number of RA-destination host commands tc: 2000
CA command processing time cT: 1 ms
RA command processing time rT: 4 ms In this case, the RA-destination host command limit value tcs, the RA-destination copy command limit value trs, and the RA-source host command limit value ics are as follows.

$$tcs = (2000/(2000+3000 \times 0.5 \times \frac{1}{4})) \times 1024 = 862$$

$$trs = 1024 - 862 = 162$$

$$ics = 162/0.5 = 324$$

The RA-source host command limit value ics falls much below 1024. However, even if receiving 324 commands or more, the RA-source storage apparatus 100 is not able to keep up with processes of RA commands, which end up accumulating. Because the RA-source host command limit value ics is kept low, it is possible to process many more RA-destination host commands. Thus, keeping the RA-source host command limit value ics as low as 324 allows an improvement in efficiency of the whole system. In addition, according to the sixth embodiment, the RA command rate p is reduced in consideration of the difference between the obtained RA-source host command limit value ics and the upper limit of the CARA port 151, i.e., 1024. This allows an increase in CA commands, which brings the RA-source host command limit value ics close to 1024. In this manner, it is possible to improve the performance of the RA-source storage apparatus 100.

Next described are command management tables individually held by the RA-source storage apparatus 100 and the RA-destination storage apparatus 200 in order to implement the function of the sixth embodiment. FIG. 24 illustrates an example of an RA-source command management table according to the sixth embodiment. According to the sixth embodiment, an RA-source command management table 55 of FIG. 24 is stored in, for example, a memory of the CM 130. In the RA-source command management table 55, the following items are set: the host command execution count; the cumulative number of RA-source host commands ic; the RA-source host command limit value ics; the RA command count; the RA command rate p; the CA command processing time cT; and the RA command processing time rT. FIG. 25 illustrates an example of an RA-destination command management table of the sixth embodiment. According to the sixth embodiment, an RA-destination command management table 56 of FIG. 25 is stored in, for example, a memory of the CM 230. In the RA-destination command management table 56, the following items are set: the host command execution count; the cumulative number of RA-destination host commands tc; the RA-destination host command limit value tcs; the copy command execution count; the cumulative number of RA-destination copy commands tr; the RA-destination copy command limit value trs; the cumulative number of RA-source host commands ic; the RA command rate p; the CA command processing time cT; and the RA command processing time rT. Among these items, the cumulative number of RA-source host commands ic, the RA command rate p, the CA command processing time cT, and the RA command processing time rT are updated by the CM 230 each time corresponding information is notified of from the storage apparatus 100 using the path monitor command 38.

Figure 26:
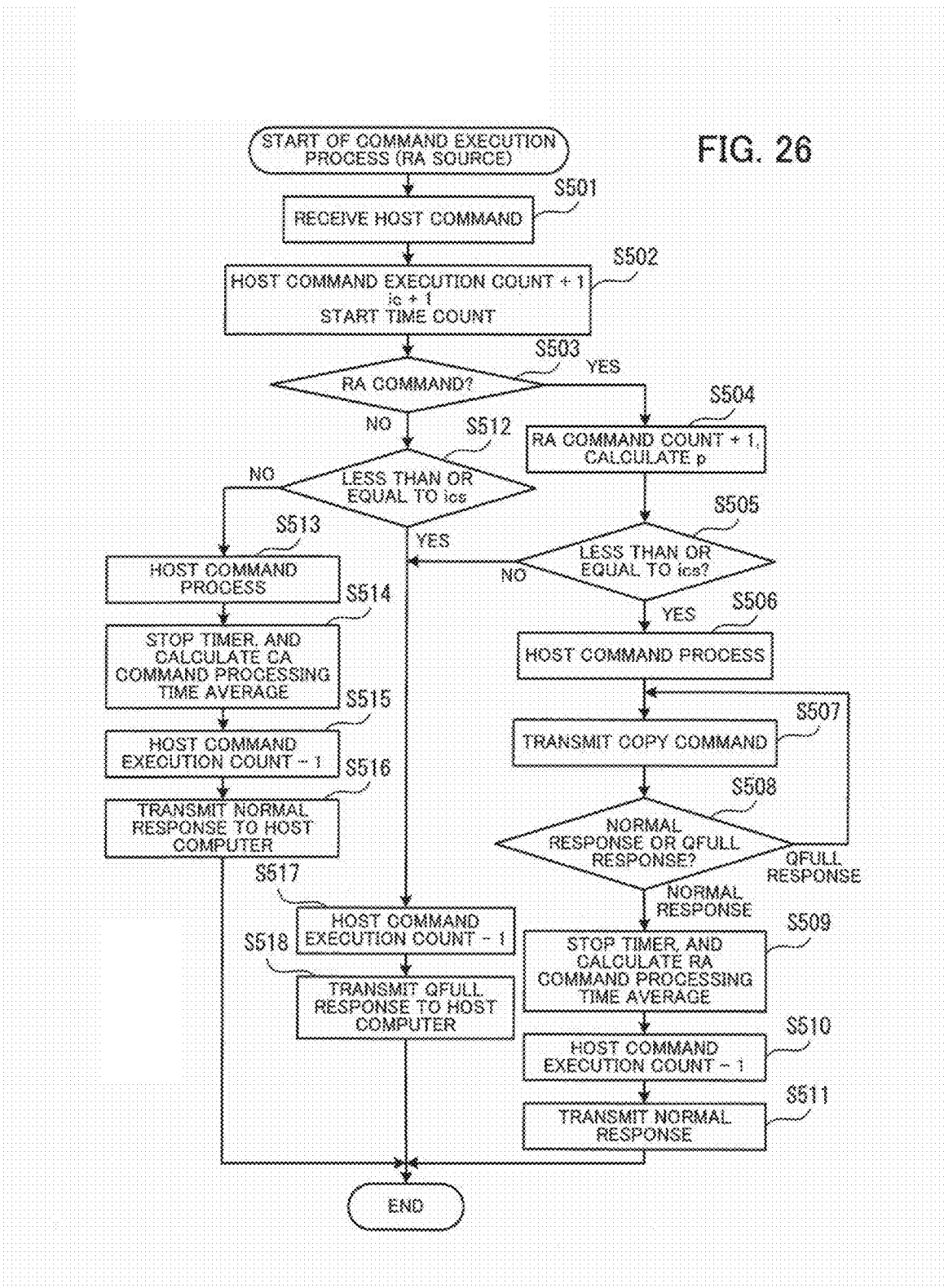
FIG. 26 is a flowchart illustrating an example of a procedure of an RA-source command execution process according to the sixth embodiment.

Next described is a command execution process in the RA-source storage apparatus 100 of the sixth embodiment. According to the sixth embodiment, the RA-source storage apparatus 100 measures the CA command processing time cT and the RA command processing time rT at the time of command execution. FIG. 26 is a flowchart illustrating an example of a procedure of the RA-source command execution process according to the sixth embodiment. Among steps illustrated in FIG. 26, operations of Steps S501, S503 to S508, S510 to S513, and S515 to S518 are the same as those of Steps S431, S433 to S446, respectively, of the fifth embodiment in FIG. 21. Accordingly, the following gives a description of Steps S502, S509, and S514, which are different operations from those of the fifth embodiment.

[Step S502] The CM 130 increments each of the host command execution count and the cumulative number of RA-source host commands ic by 1. In addition, the CM 130 resets a timer and starts time count.

[Step S509] When the received host command is an RA command, the CM 130 stops the timer after receiving a normal response from the storage apparatus 200. Next, the CM 130 calculates an RA command processing time average. The calculated RA command processing time average is the RA command processing time rT.

For example, the CM 130 has an executed RA command count in a memory, and increments the executed RA command count each time an RA command is executed. In addition, the CM 130 has an RA command total execution time in the memory, and adds an execution time measured by the timer to the executed RA command total execution time each time an RA command is executed. Then, the CM 130 calculates the RA command processing time average by dividing the RA command total execution time by the executed RA command count. The CM 130 updates the RA command processing time rT of the RA-source command management table 55 with the calculated RA command processing time average.

[Step S514] When the received host command is a CA command, the CM 130 stops the timer after the completion of the host command process. Next, the CM 130 calculates a CA command processing time average. The calculated CA command processing time average is the CA command processing time cT.

For example, the CM 130 has an executed CA command count in a memory, and increments the executed CA command count each time a CA command is executed. In addition, the CM 130 has a CA command total execution time in the memory, and adds an execution time measured by the timer to the executed CA command total execution time each time a CA command is executed. Then, the CM 130 calculates the CA command processing time average by dividing the CA command total execution time by the executed CA command count. The CM 130 updates the CA command processing time cT of the RA-source command management table 55 with the calculated CA command processing time average.

As described above, in the storage apparatus 100, the CA command processing time cT or the RA command processing time rT is calculated for each command execution. Then, the calculated CA command processing time cT or RA command processing time rT is notified of to the RA-destination storage apparatus 200 using a path monitor command.

Figure 27:
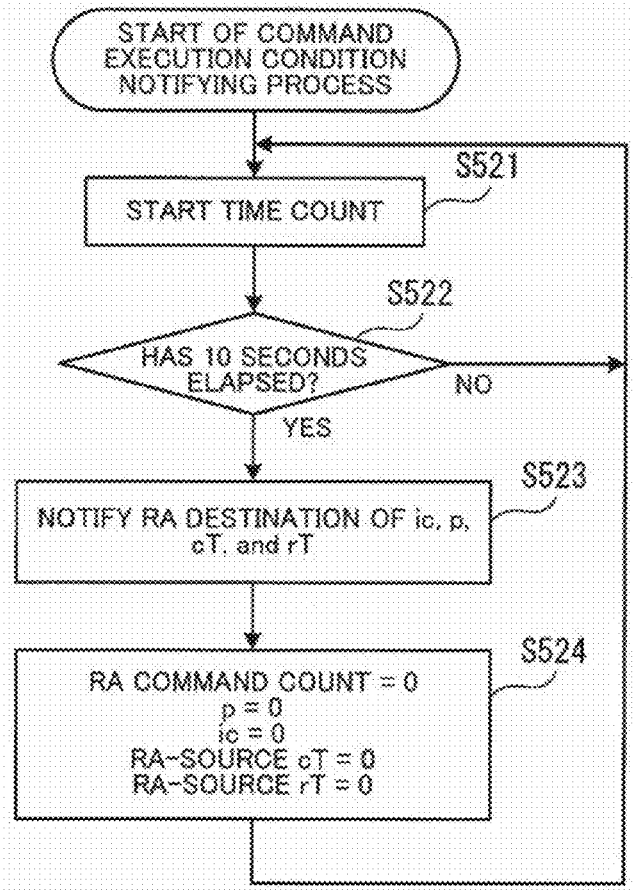
FIG. 27 is a flowchart illustrating an example of a procedure of a command execution condition notifying process in the RA source according to the sixth embodiment.

Next described is a command execution condition notifying process performed in the RA-source storage apparatus 100. FIG. 27 is a flowchart illustrating an example of a procedure of the command execution condition notifying process in the RA source according to the sixth embodiment. The command execution condition notifying process of FIG. 27 is described next according to the step numbers in the flowchart.

[Step S521] The CM 130 of the storage apparatus 100 resets a timer and starts time count.

[Step S522] The CM 130 determines whether the timer has counted 10 seconds. If 10 seconds has yet to elapse, the CM 130 advances the process to Step S521. If 10 seconds has elapsed, the CM 130 advances the process to Step S523.

[Step S523] The CM 130 notifies the storage apparatus 200 of the cumulative number of RA-source host commands ic, the RA command rate p, the CA command processing time cT, and the RA command processing time rT. For example, the CM 130 acquires the cumulative number of RA-source host commands ic, the RA command rate p, the CA command processing time cT, and the RA command processing time rT from the RA-source command management table 55. Next, the CM 130 generates a control packet which includes the acquired cumulative number of RA-source host commands ic, RA command rate p, CA command processing time cT, and RA command processing time rT in its header. Then, the CM 130 transmits the generated control packet to the storage apparatus 200 via the CARA port 151.

[Step S524] The CM 130 initializes each value of the RA command count, the RA command rate p, the cumulative number of RA-source host commands ic, the CA command processing time cT, and the RA command processing time rT of the RA-source command management table 55 to 0. Subsequently, the CM 130 advances the process to Step S521.

In this manner, information including the CA command processing time cT and the RA command processing time rT is transmitted from the storage apparatus 100 to the storage apparatus 200 at intervals of 10 seconds.

Figure 28:
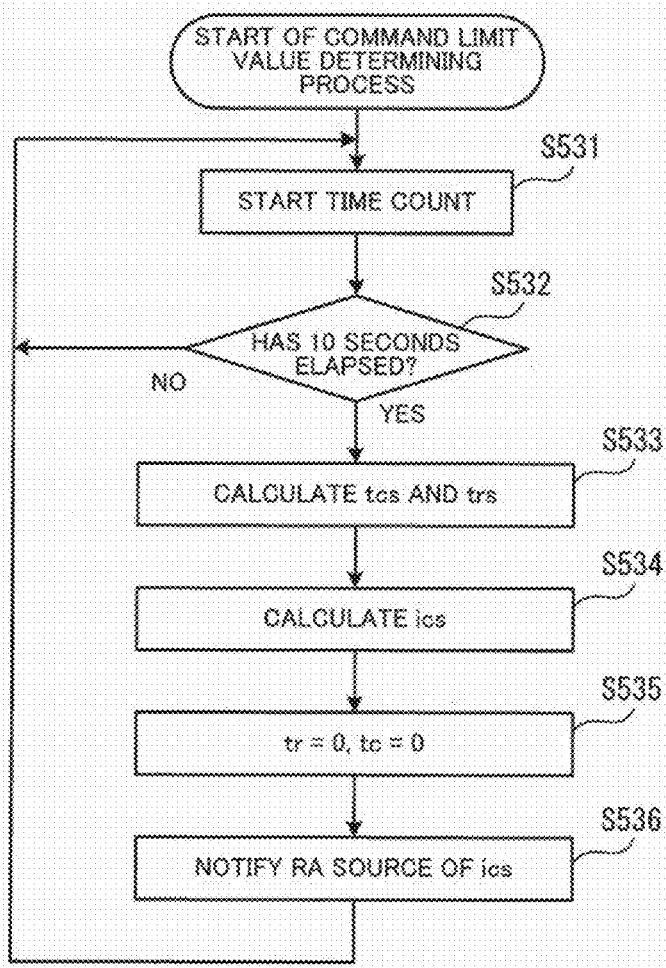
FIG. 28 is a flowchart illustrating a procedure of a command limit value determining process in the RA destination according to the sixth embodiment.

Next described is a procedure of a command limit value determining process performed in the RA-destination storage apparatus 200. FIG. 28 is a flowchart illustrating a procedure of the command limit value determining process in the RA destination according to the sixth embodiment. The command limit value determining process of FIG. 28 is described next according to the step numbers in the flowchart.

[Step S531] The CM 230 resets a timer and starts time count.

[Step S532] The CM 230 determines whether the timer has counted 10 seconds. If 10 seconds has yet to elapse, the CM 230 advances the process to Step S531. If 10 seconds has elapsed, the CM 230 advances the process to Step S533.

[Step S533] The CM 230 calculates the RA-destination host command limit value tcs and the RA-destination copy command limit value trs. For example, the CM 230 acquires, from the RA-destination command management table 53, the cumulative number of RA-source host commands ic, the RA command rate p, the cumulative number of RA-destination host commands tc, the CA command processing time cT, and the RA command processing time rT. Subsequently, the CM 230 calculates the RA-destination host command limit value tcs and the RA-destination copy command limit value trs according to the above Equations (13) and (14). Further, the CM 230 updates the RA-destination host command limit value tcs and the RA-destination copy command limit value trs of the RA-destination command management table 56 with the calculated RA-destination host command limit value tcs and RA-destination copy command limit value trs.

[Step S534] The CM 230 calculates the RA-source host command limit value ics. For example, the CM 230 acquires the RA-destination copy command limit value trs and the RA command rate p from the RA-destination command management table 53. Subsequently, the CM 230 calculate the RA-source host command limit value ics according to the above Equation (15).

[Step S535] The CM 230 initializes the cumulative number of RA-destination host commands tc and the cumulative number of RA-destination copy commands tr of the RA-destination command management table 53 to 0.

[Step S536] The CM 230 notifies the RA-source storage apparatus 100 of the RA-source host command limit value ics calculated in Step S534. Subsequently, the CM 230 advances the process to Step S531.

In the above-described manner, it is possible to set an appropriate command limit value in consideration of the difference between the CA command processing time cT and the RA command processing time rT of the RA-source storage apparatus 100. As a result, it is possible to prevent the processes of RA commands, each of which requires a long processing time, from remaining incomplete and accumulating. This, in turn, prevents a reduction in the processing efficiency of the storage apparatus 100.

(g) Seventh Embodiment

Next described is a seventh embodiment. The seventh embodiment relates to dynamically changing a command flow control technology according to command input conditions so as to prevent processing load for command flow control from being imposed on storage apparatuses. Note that the system configuration of the seventh embodiment is the same as that of the second embodiment illustrated in FIGS. 2 and 3. For example, according to the seventh embodiment, in the case where no priority needs to be given in terms of command processing efficiency and balanced execution of host commands between the RA source and the RA destination, command flow control is performed using a technology which imposes the minimum processing load on the storage apparatuses. Note that switching from one command flow control technology to another requires to comprehend the command execution conditions at the storage apparatuses 100 and 200. Assume therefore that, in the case of applying any command flow control technology, information exchange is being performed between the storage apparatuses using path monitor commands, as in the sixth embodiment.

When the above-described second to sixth embodiments are compared in terms of processing load, the second embodiment imposes the lowest processing load on the storage apparatuses. Note however that the command execution conditions are not monitored in the second embodiment, therefore, the second embodiment is not able to accommodate changing of a command flow control technology according to the command input conditions. For example, in the case where an RA session is not established between the storage apparatuses, the application of the command flow control technology according to the third embodiment simplifies the command execution process of the RA destination, as illustrated in FIG. 8. Furthermore, just a small amount of information is required for the command flow control, as illustrated in FIG. 7, and less processing load is imposed on the storage apparatuses compared to the fourth to sixth embodiments. In the case where an RA session has been established between the storage apparatuses, the command flow control technology of the third embodiment is not sufficient in terms of the command processing efficiency. If an RA session has been established and processing load imposed on the RA-source storage apparatus 100 is low (for example, the cumulative number of RA-source host commands is less than or equal to 1024), a host command input to the RA-source storage apparatus 100 is executed without transmission of a QFULL response. Therefore, an adequate command process is performed by the command flow control technology of the fourth embodiment. The command flow control technology of the fourth embodiment imposes less load on the storage apparatuses 100 and 200 compared to the command flow control technologies of the fifth and sixth embodiments. Therefore, if an RA session has been established and processing load imposed on the RA-source storage apparatus 100 is low, the command flow control technology of the fourth embodiment is adequate. When high processing load is imposed on the RA-source storage apparatus 100 (for example, the cumulative number of RA-source host commands is exceeds 1024), the command flow control technology of the fourth embodiment is not adequate in order to achieve balanced execution of host commands output from the individual host computers 21 and 22. In this case, the command flow control technology of the fifth or sixth embodiment is adequate. For example, if the CA command execution time and the RA command execution time in the RA-source storage apparatus 100 are approximately the same, the command flow control technology of the fifth embodiment is adequate. On the other hand, if there is a difference between the CA command execution time and the RA command execution time, the command flow control technology of the sixth embodiment is adequate. Note however that determining whether the command flow control technology of the fifth embodiment or the sixth embodiment is adequate requires measurements of the CA command processing time cT and the RA command processing time rT and a process of comparing the measurements. In this case, the processing load imposed on the storage apparatuses 100 and 200 becomes the same as that in the case where the command flow control technology of the sixth embodiment is applied. Accordingly, in the seventh embodiment, the command flow control technology of the sixth embodiment is applied when processing load imposed on the RA-source storage apparatus 100 is high.

Figure 29:
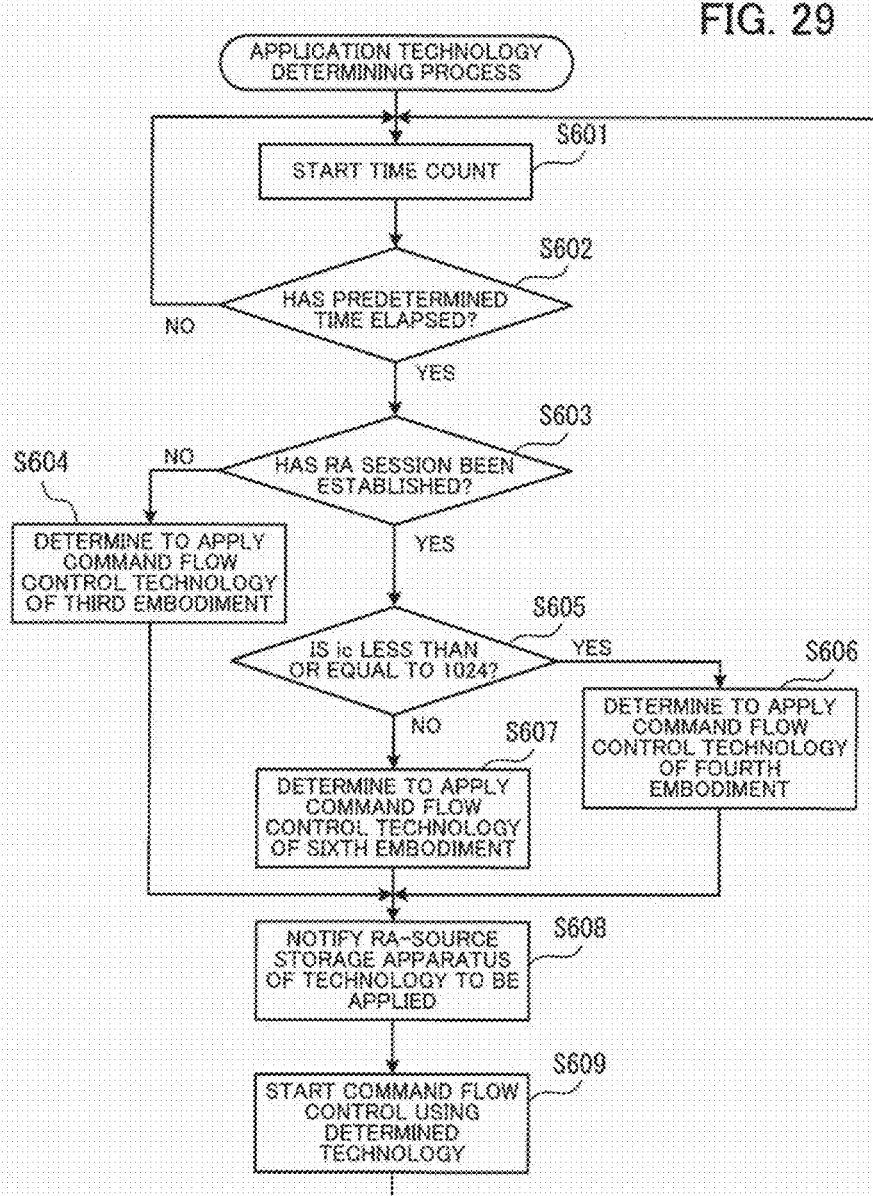
FIG. 29 is a flowchart illustrating an example of a procedure of an application technology determining process.

A command flow control technology to be applied is determined by, for example, the storage apparatus 200. Next described is an application technology determining process performed in the storage apparatus 200. FIG. 29 is a flowchart illustrating an example of a procedure of the application technology determining process. The application technology determining process of FIG. 29 is described next according to the step numbers in the flow chart.

[Step S601] The CM 230 of the storage apparatus 200 resets a timer and starts time count.

[Step S602] The CM 230 determines whether the timer has counted a predetermined time (for example, 10 seconds). If the predetermined time has yet to elapse, the CM 230 advances the process to Step S601. If the predetermined time has elapsed, the CM 230 advances the process to Step S603.

[Step S603] The CM 230 determines whether an RA session has been established between the storage apparatuses 100 and 200. If an RA session has been established, the CM 230 advances the process to Step S605. On the other hand, if an RA session is not established, the CM 230 advances the process to Step S604.

[Step S604] The CM 230 determines to apply the command flow control technology described in the third embodiment. Subsequently, the CM 230 advances the process to Step S608.

[Step S605] The CM 230 determines whether the cumulative number of RA-source host commands ic is less than or equal to 1024. If the cumulative number of RA-source host commands ic is less than or equal to 1024, the CM 230 advances the process to Step S606. On the other hand, if the cumulative number of RA-source host commands ic exceeds 1024, the CM 230 advances the process to Step S607.

[Step S606] The CM 230 determines to apply the command flow control technology described in the fourth embodiment. Subsequently, the CM 230 advances the process to Step S608.

[Step S607] The CM 230 determines to apply the command flow control technology described in the sixth embodiment.

[Step S608] The CM 230 notifies the RA-source storage apparatus 100 of the command flow control technology to be applied.

[Step S609] The CM 230 starts command flow control according to the technology determined to be applied. Subsequently, the CM 230 advances the process to Step S601.

In the above-described manner, it is possible to apply an adequate command flow control technology according to command input conditions. This reduces processing load imposed on the storage apparatuses 100 and 200, which in turn reduces power consumption.

(h) Other Embodiments

The processing functions described in the individual embodiments above may be achieved by a computer. In this case, a program is provided in which processing contents of functions that a CM of a storage apparatus has are described. By executing the program on the computer, the above-described processing functions are achieved on the computer. The program in which processing contents are described may be recorded in a computer-readable recording medium. Such computer-readable recording media include a magnetic-storage device, an optical disk, a magneto-optical medium, and a semiconductor memory. Examples of the magnetic-storage device are a hard disk drive (HDD), a flexible disk (FD), and a magnetic tape. Examples of the optical disk are a digital versatile disk (DVD), a digital versatile disk random access memory (DVD-RAM), a compact disc read-only memory (CD-ROM), and a CD rewritable (CD-RW). An example of the magneto-optical medium is a magneto-optical disk (MO). Note that recording media for recording the program do not include transitory propagating signals themselves.

In the case of distributing the program, portable recording media, such as DVDs and CD-ROMs, in which the program is recorded are sold. In addition, the program may be stored in a memory device of a server computer and then transferred from the server computer to another computer via a network.

A computer for executing the program stores the program, which is originally recorded in a portable recording medium or transferred from the server computer, in its own memory device. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from the server computer. In addition, at least part of the above-described processing functions may be achieved by an electronic circuit, such as a digital signal processor (DSP), an application specific integrated circuit (ASIC), and a programmable logic device (PLD).

According to one aspect, it is possible to prevent a reduction in the processing efficiency caused by a processing increase according to the process type.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising:
a memory device;
a communication interface configured to receive a command instructing data access to the memory device; and
a processor configured to perform a procedure including:
counting, among commands received via the communication interface, a number of commands currently being executed,
performing data access to the memory device according to a command newly received via the communication interface, when the number of commands currently being executed is less than or equal to a limit value that is selected depending on whether the newly received command is a copy command transmitted from a different storage apparatus or a non-copy command whose type is other than the copy command, and preventing the data access when the number of commands currently being executed exceeds the selected limit value.

2. The storage apparatus according to claim 1, wherein the procedure further includes setting a limit value corresponding to non-copy commands to be lower than a limit value corresponding to copy commands.

3. The storage apparatus according to claim 2, wherein:
as the limit value corresponding to non-copy commands, a first limit value and a second limit value are set, the first limit value being applied when a communication path for data copy has been established between the storage apparatus and the different storage apparatus, and the second limit value having a higher value than the first limit value and being applied when the communication path is not established;
when the communication path has been established, the performing includes performing data access to the memory device according to a non-copy command received via the communication interface when the number of commands currently being executed is less than or equal to the first limit value, and the preventing includes preventing the data access according to the non-copy command when the number of commands currently being executed exceeds the first limit value; and
when the communication path is not established, the performing includes performing data access to the memory device according to a non-copy command received via the communication interface when the number of commands currently being executed is less than or equal to the second limit value, and the preventing includes preventing the data access according to the non-copy command when the number of commands currently being executed exceeds the second limit value.

4. A storage apparatus comprising:
a memory device;
a communication interface configured to receive a command instructing data access to the memory device; and
a processor configured to perform a procedure including:
determining a type of the command received via the communication interface counting, among commands received via the communication interface, a number of commands currently being executed and a number of commands received within a predetermined period of time with respect to each type of commands, performing, when the number of commands currently being executed is less than or equal to a limit value corresponding to the type of a command newly received via the communication interface, data access to the memory device according to the newly received command, preventing the data access when the number of commands currently being executed exceeds the limit value, and determining a limit value corresponding to each type of commands according to a command-type specific ratio of the commands received within the predetermined period of time.

5. The storage apparatus according to claim 1, wherein:
the counting further includes counting a number of non-copy commands received within a predetermined period of time; and
the procedure further includes:
    acquiring, from the different storage apparatus, information indicating a number of trigger commands received within the predetermined period of time, each of the trigger commands being a trigger of an output of a copy command from the different storage apparatus, and determining limit values individually corresponding to copy commands and non-copy commands according to a ratio of the number of trigger commands received by the different storage apparatus to the number of non-copy commands.

6. The storage apparatus according to claim 1, wherein:
the counting further includes counting a number of non-copy commands received within a predetermined period of time; and
the procedure further includes:
    acquiring trigger command information, first time information, and second time information from the different storage apparatus, the trigger command information indicating a number of trigger commands received within the predetermined period of time, each of which is a trigger of an output of a copy command from the different storage apparatus, the first time information indicating a time required by the different storage apparatus to execute each of the trigger commands, the second time information indicating a time required by the different storage apparatus to execute each of commands other than the trigger commands, and
determining limit values individually corresponding to copy commands and non-copy commands according to a ratio of a multiplication result to the number of non-copy commands, the multiplication result being obtained by multiplying the number of trigger commands received by the different storage apparatus by a correction value which is obtained by dividing the time indicated in the second time information by the time indicated in the first time information.

7. The storage apparatus according to claim 5, wherein each of the trigger commands is a command instructing data writing to a volume provided inside the different storage apparatus, the volume being configured to redundantly store data together with the memory device.

8. The storage apparatus according to claim 5, wherein the procedure further includes instructing the different storage apparatus to limit a number of commands executed by the different storage apparatus to a value according to the determined limit value corresponding to copy commands.

9. A command execution control method comprising:
    counting, by a storage apparatus, a number of commands currently being executed among commands received via the communication interface;
    performing, by the storage apparatus, data access to the memory device according to a command newly received via the communication interface, when the number of commands currently being executed is less than or equal to a limit value that is selected depending on whether the newly received command is a copy command transmitted from a different storage apparatus or a non-copy command whose type is other than the copy command; and
    preventing, by the storage apparatus, the data access when the number of commands currently being executed exceeds the selected limit value.

10. A computer-readable storage medium storing a computer program, the computer program causing a built-in computer of a storage apparatus to perform a procedure comprising:
    determining a type of a command received via a communication interface and instructing data access to a memory device;
    counting, among commands received via the communication interface, a number of commands currently being executed;
    performing data access to the memory device according to a command newly received via the communication interface, when the number of commands currently being executed is less than or equal to a limit value that is selected depending on whether the newly received command is a copy command transmitted from a different storage apparatus or a non-copy command whose type is other than the copy command; and
    preventing the data access when the number of commands currently being executed exceeds the selected limit value.

* * * * *